United States Patent
Park et al.

(10) Patent No.: US 9,088,323 B2
(45) Date of Patent: Jul. 21, 2015

(54) METHOD AND APPARATUS FOR REPORTING DOWNLINK CHANNEL STATE

(71) Applicant: LG ELECTRONICS INC., Seoul (KR)

(72) Inventors: Hanjun Park, Seoul (KR); Youngtae Kim, Seoul (KR); Kijun Kim, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/150,405

(22) Filed: Jan. 8, 2014

(65) Prior Publication Data

US 2014/0192918 A1 Jul. 10, 2014

Related U.S. Application Data

(60) Provisional application No. 61/750,764, filed on Jan. 9, 2013, provisional application No. 61/774,557, filed on Mar. 7, 2013, provisional application No. 61/807,343, filed on Apr. 2, 2013, provisional application No. 61/811,791, filed on Apr. 14, 2013.

(51) Int. Cl.
*H04B 7/02* (2006.01)
*H04B 7/04* (2006.01)
*H04W 88/02* (2009.01)
*H04W 88/08* (2009.01)
*H04L 1/06* (2006.01)

(52) U.S. Cl.
CPC ............ *H04B 7/0486* (2013.01); *H04B 7/0469* (2013.01); *H04B 7/0478* (2013.01); *H04W 88/02* (2013.01); *H04W 88/08* (2013.01); *H04L 1/06* (2013.01); *H04L 1/0618* (2013.01)

(58) Field of Classification Search
CPC ....... H04B 7/0456; H04L 1/0618; H04L 1/06
See application file for complete search history.

(56) References Cited

U.S. PATENT DOCUMENTS

| | | | |
|---|---|---|---|
| 7,698,132 B2 * | 4/2010 | Kandhadai et al. | 704/222 |
| 2010/0069122 A1 * | 3/2010 | Ito | 455/562.1 |
| 2012/0087425 A1 * | 4/2012 | Gomadam et al. | 375/260 |
| 2012/0218948 A1 * | 8/2012 | Onggosanusi et al. | 370/329 |
| 2013/0114655 A1 * | 5/2013 | Gomadam | 375/219 |
| 2013/0303180 A1 * | 11/2013 | Wang et al. | 455/450 |
| 2014/0126618 A1 * | 5/2014 | Kobayashi et al. | 375/224 |
| 2014/0177683 A1 * | 6/2014 | Krishnamurthy et al. | 375/219 |
| 2014/0177744 A1 * | 6/2014 | Krishnamurthy et al. | 375/267 |
| 2014/0177745 A1 * | 6/2014 | Krishnamurthy et al. | 375/267 |
| 2014/0254508 A1 * | 9/2014 | Krishnamurthy et al. | 370/329 |

* cited by examiner

*Primary Examiner* — Santiago Garcia

(74) *Attorney, Agent, or Firm* — Birch, Stewart, Kolasch & Birch, LLP

(57) ABSTRACT

A method of reporting a channel state to a base station supporting downlink multiple input multiple output in a wireless communication system includes measuring a downlink channel based on a downlink signal received from the base station, and reporting a codebook index for precoding of the downlink signal according to the measurement of the downlink channel. The codebook for precoding includes an improved codebook (hereinafter, referred to as an improved 4Tx codebook) having a dual structure composed of a codebook for wideband and a codebook for subband, for 4 transmit (4Tx) antenna ports, and the improved 4Tx codebook includes sub-codebooks obtained by sub-sampling the codebook for subband according to priority.

12 Claims, 7 Drawing Sheets

(a)

(b)

METHOD AND APPARATUS FOR REPORTING DOWNLINK CHANNEL STATE

This application claims the benefit of U.S. provisional application Nos. 61/750,764 filed on Jan. 9, 2013, 61/774,557 filed on Mar. 7, 2013, 61/807,343 filed on Apr. 2, 2013 and 61/811,791 filed on Apr. 14, 2013, which are hereby incorporated by reference as if fully set forth herein.

BACKGROUND OF THE INVENTION

1. Field of the Invention

The present invention relates to a wireless communication system, and more particularly, to a method and apparatus for reporting a downlink channel state.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for reporting a downlink channel state that substantially obviates one or more problems due to limitations and disadvantages of the related art.

An object of the present invention is to provide a method for more accurately and efficiently performing feedback on a downlink channel. An object of the present invention is to provide a method of improving downlink reception performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reporting a channel state to a base station supporting downlink multiple input multiple output in a wireless communication system includes measuring a downlink channel based on a downlink signal received from the base station, and reporting a codebook index for precoding of the downlink signal according to the measurement of the downlink channel. The codebook for precoding includes an improved codebook (hereinafter, referred to as an improved 4Tx codebook) having a dual structure composed of a codebook for wideband and a codebook for subband, for 4 transmit (4Tx) antenna ports, and the improved 4Tx codebook includes sub-codebooks obtained by sub-sampling the codebook for subband according to priority.

In another aspect of the present invention, a user equipment (UE) configured to report a channel state to a base station supporting downlink multiple input multiple output (MIMO) in a wireless communication system includes a radio frequency (RF) unit, and a processor configured to control the RF unit. The processor is configured to measure a downlink channel based on a downlink signal received from the base station and to report a codebook index for precoding of the downlink signal according to the measurement of the downlink channel, the codebook for precoding includes an improved codebook (hereinafter, referred to as an improved 4Tx codebook) having a dual structure composed of a codebook for wideband and a codebook for subband, for 4 transmit (4Tx) antenna ports, and the improved 4Tx codebook includes sub-codebooks obtained by sub-sampling the codebook for subband according to priority.

In another aspect of the present invention, a base station supporting downlink multiple input multiple output (MIMO) in a wireless communication system includes a radio frequency (RF) unit, and a processor configured to control the RF unit. The processor is configured to transmit a downlink signal to a user equipment (UE) and to receive a codebook index for precoding of the downlink signal according to measurement of the downlink channel based on the downlink signal, the codebook for precoding includes an improved codebook (hereinafter, referred to as an improved 4Tx codebook) having a dual structure composed of a codebook for wideband and a codebook for subband, for 4 transmit (4Tx) antenna ports, and the improved 4Tx codebook includes sub-codebooks obtained by sub-sampling the codebook for subband according to priority.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
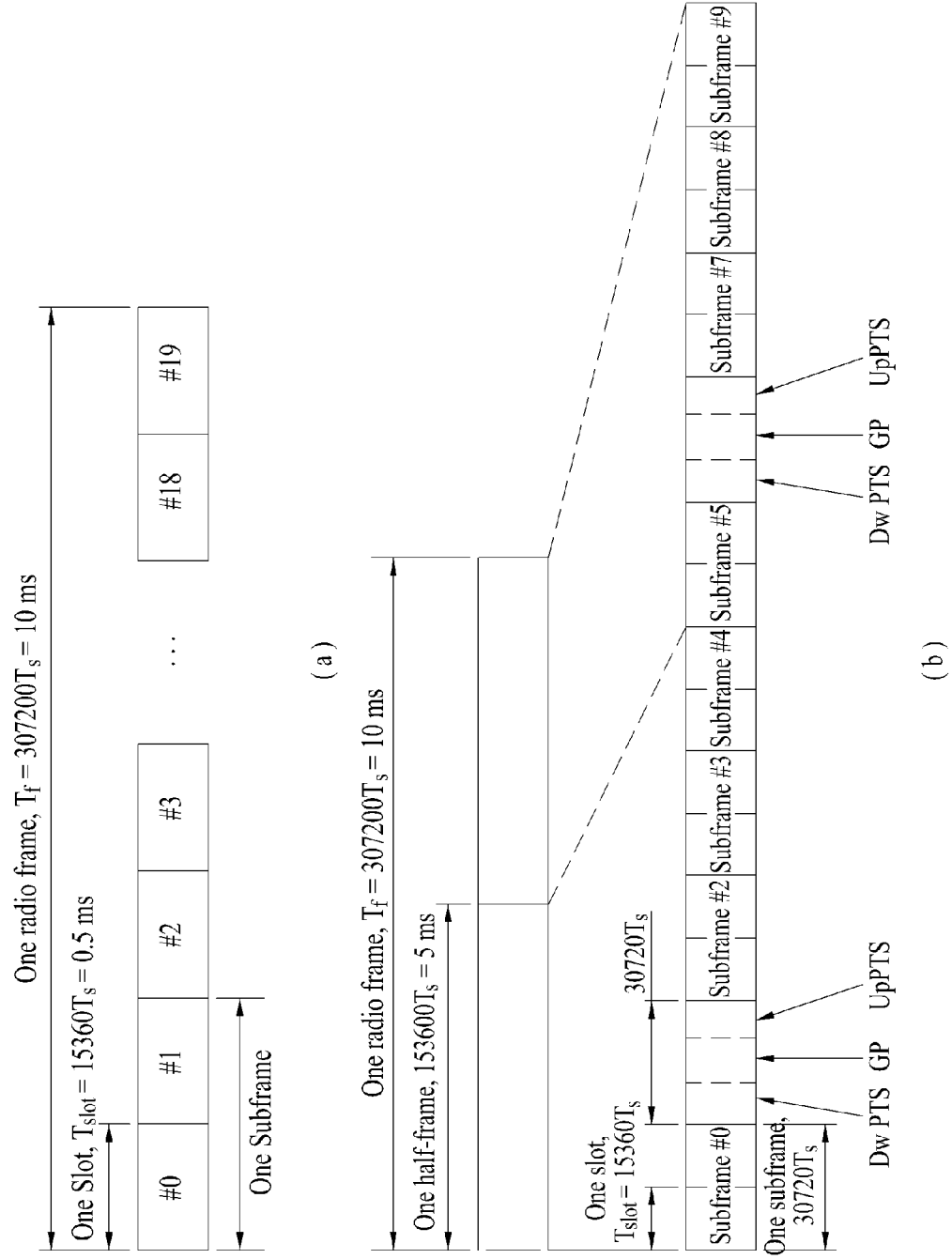
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic refix in uplink | Extended cyclic prefix in uplink | DwPTS ee | Normal cyclic prefix in uplink | Extended cyclic prefix in uplink |
| 0 | 6592 • $T_s$ | 2192 • $T_s$ | 2560 • $T_s$ | 7680 • $T_s$ | 2192 • $T_s$ | 2560 • $T_s$ |
| 1 | 19760 • $T_s$ | | | 20480 • $T_s$ | | |
| 2 | 21952 • $T_s$ | | | 23040 • $T_s$ | | |
| 3 | 24144 • $T_s$ | | | 25600 • $T_s$ | | |
| 4 | 26336 • $T_s$ | | | 7680 • $T_s$ | | |
| 5 | 6592 • $T_s$ | 4384 • $T_s$ | 5120 • $T_s$ | 20480 • $T_s$ | 4384 • $T_s$ | 5120 • $T_s$ |
| 6 | 19760 • $T_s$ | | | 23040 • $T_s$ | | |
| 7 | 21952 • $T_s$ | | | — | — | — |
| 8 | 24144 • $T_s$ | | | — | — | — |

Figure 2:
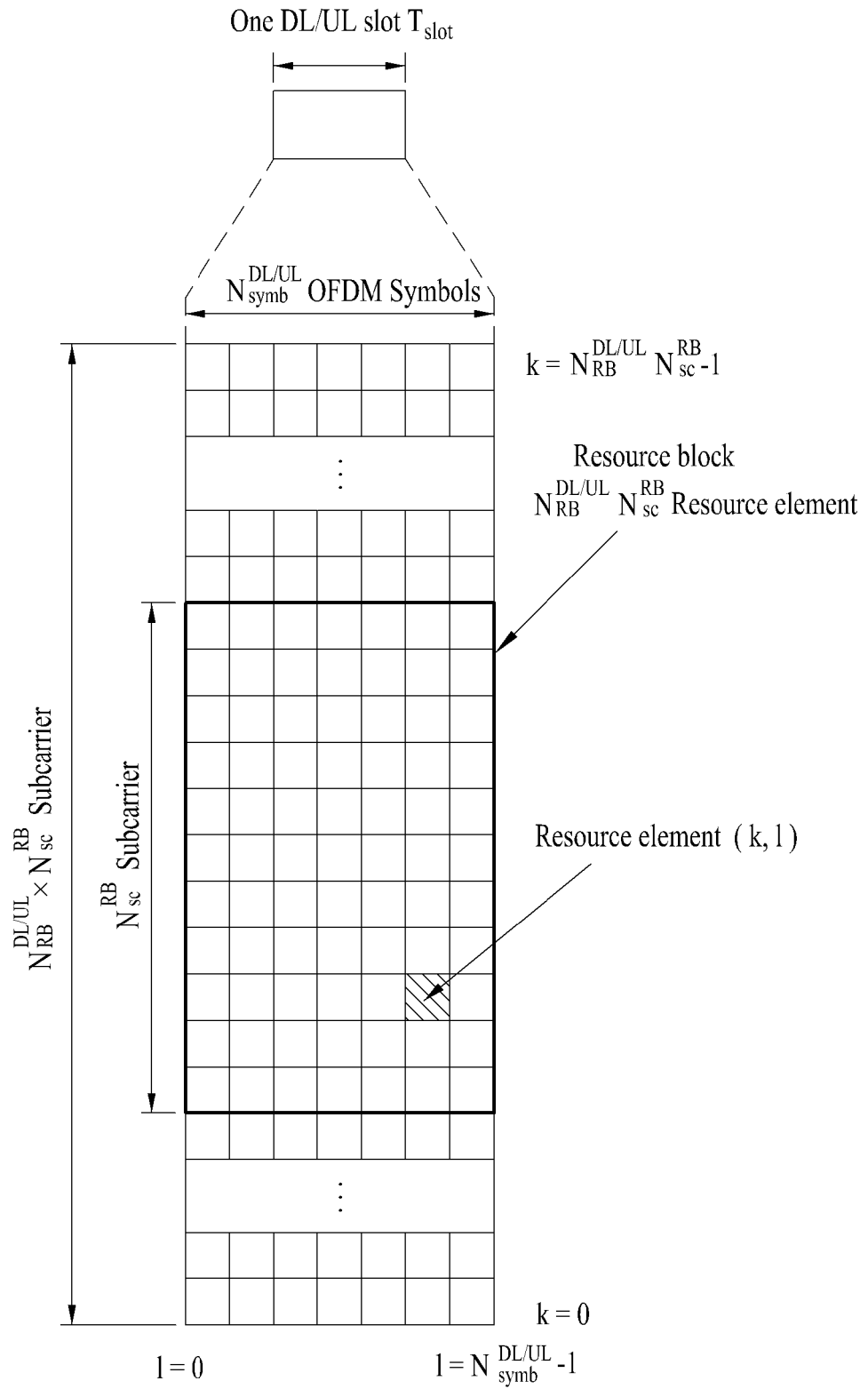
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
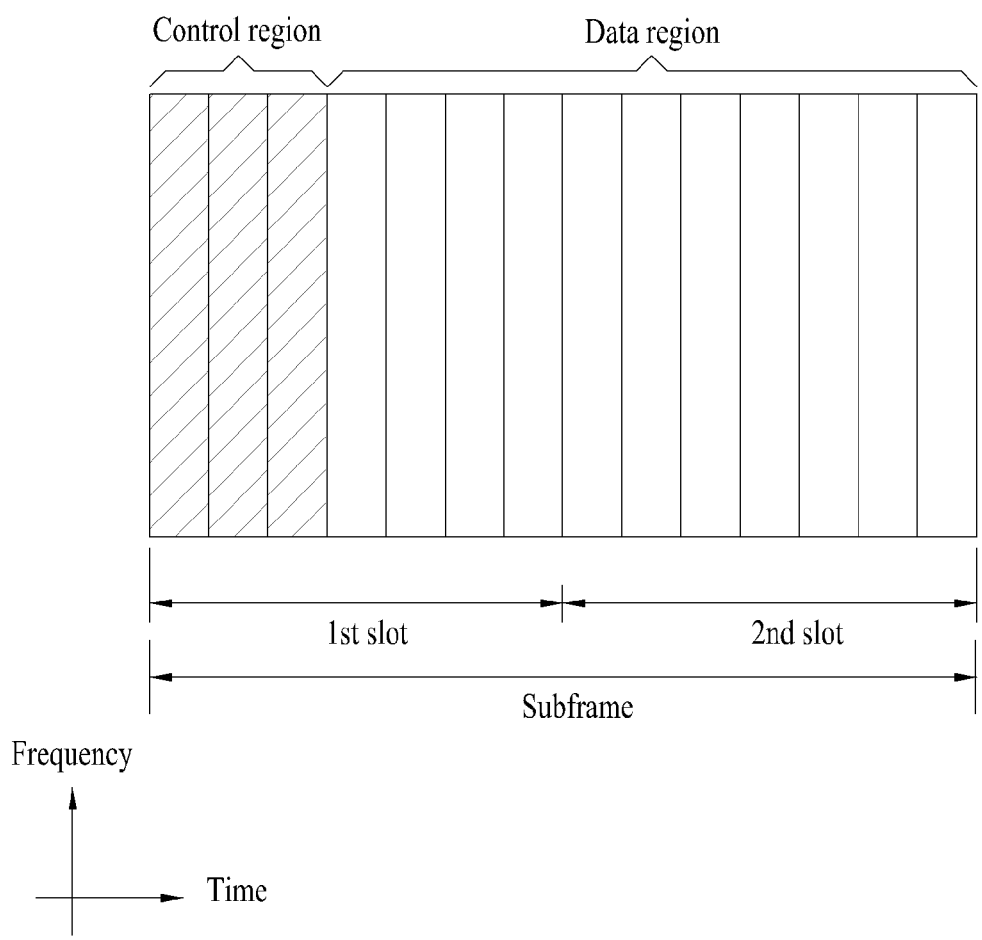
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
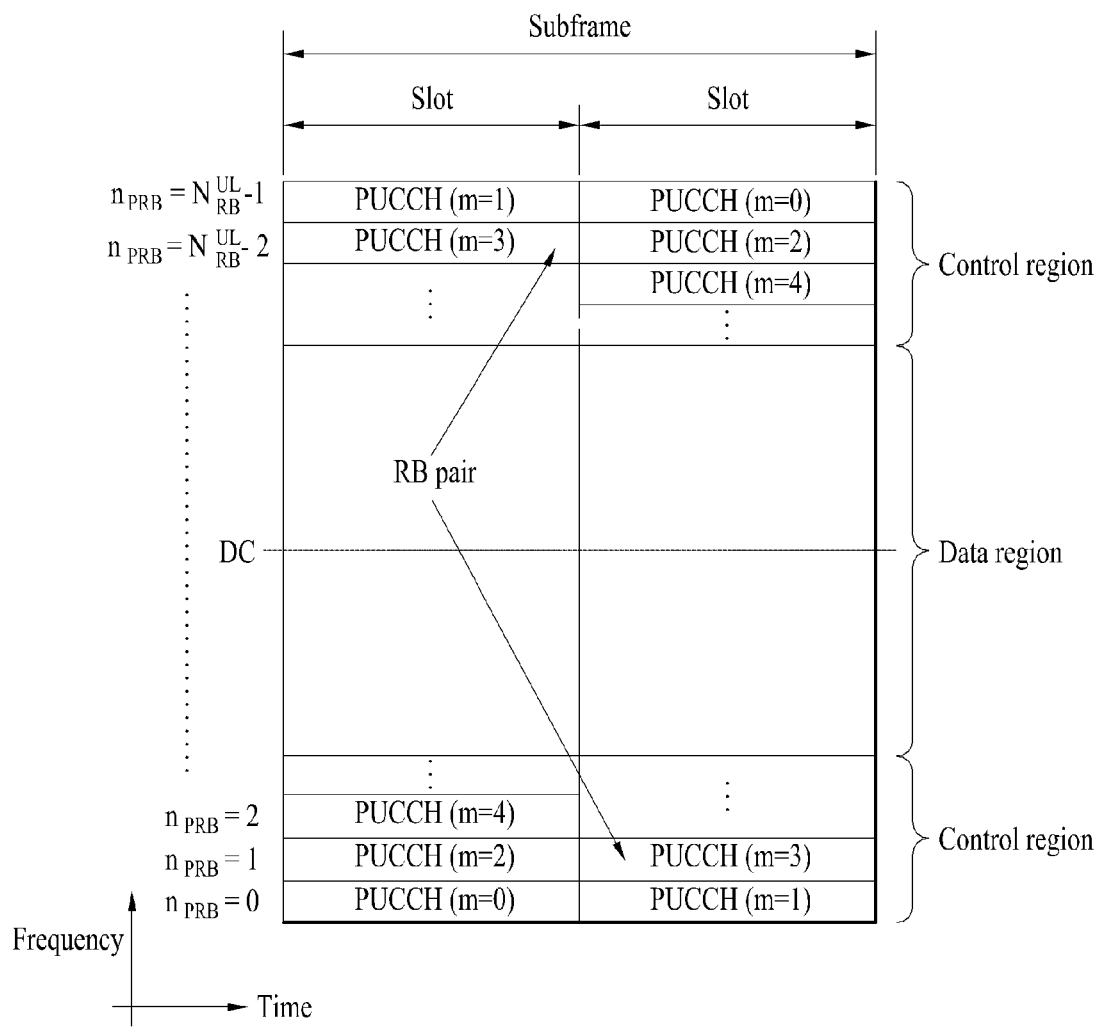
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
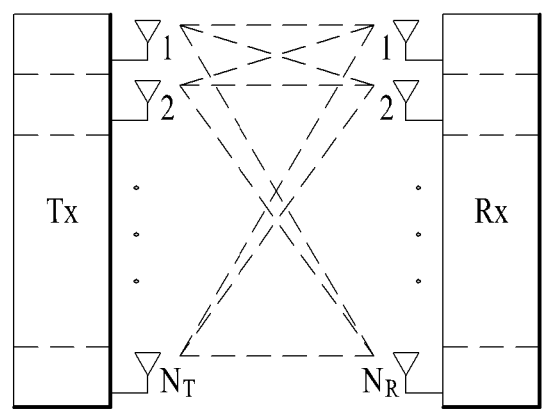
FIG. 5 is a block diagram showing a multi-input multi-output (MIMO) used in a 3GPP LTE/LTE-A system.
Figure 5:
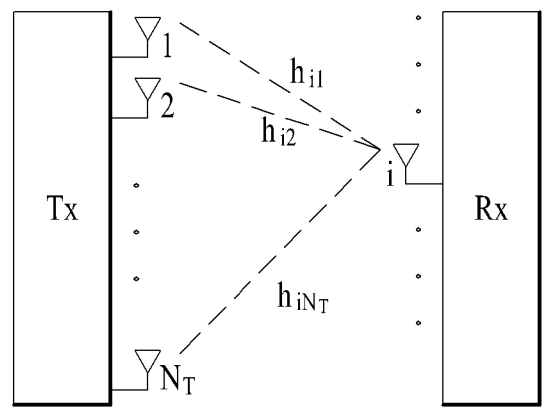

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1 Ps_2, \ldots, Ps_{N_T}]^T \qquad \text{[Equation 3]}$$

The transmission power-controlled transmission information vector i may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, s_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $w_{ij}$ denotes a weight between an ith Tx antenna and a jth piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \qquad \text{[Equation 5]}$$

$$\begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Here, $W_{ij}$ denotes a weight between an i-th Tx antenna and j-th information. W is also called a precoding matrix.

Given NR Rx antennas, signals received at the respective Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}] \qquad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{21} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Equation 8]}$$

Actual channels experience the above channel matrix H and then are added with Additive white Gaussian noise (AWGN). The AWGN $n_1, n_2, \ldots, n_{N_R}$ added to the NR Rx antennas is given as the following vector.

$$n = [n_1, n_2, \ldots, n_{N_R}]^T \qquad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \qquad \text{[Equation 11]}$$

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

Codebook Based Precoding Scheme

A precoding scheme for appropriately distributing transmission information according to the channel states of antennas is applicable in order to support MIMO transmission. A codebook based precoding scheme refers to a scheme for predetermining a set of precoding matrices between a transmitter and a receiver, measuring channel information from the transmitter at the receiver, feeding a suitable precoding matrix (that is, a precoding matrix index (PMI)) back to the transmitter and applying the suitable precoding matrix to signal transmission at the transmitter. Since a suitable precoding matrix is selected from the predetermined set of precoding matrices, an optimal precoding matrix may not always be applied but feedback overhead can be reduced as compared to explicit feedback of optimal precoding information in actual channel information.

Figure 6:
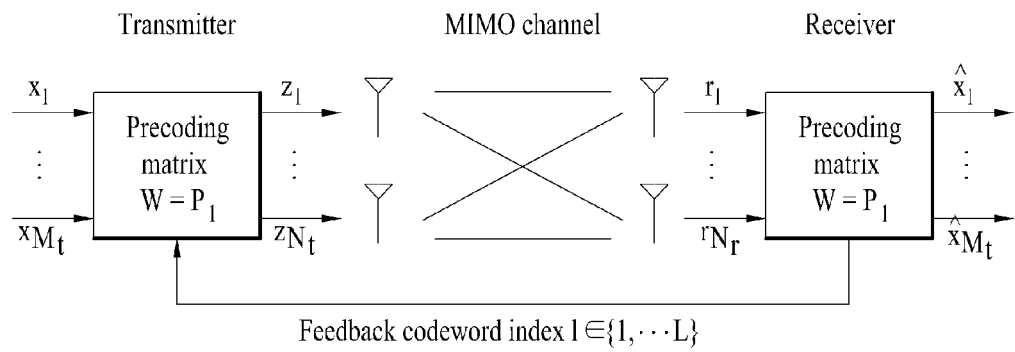
FIG. 6 is a diagram illustrating codebook based beamforming.

FIG. 6 is a diagram illustrating the basic concept of codebook based precoding.

In a codebook based precoding scheme, a transmitter and a receiver share codebook information including a predetermined number of precoding matrices predetermined according to transmission rank, number of antennas, etc. That is, if feedback information is finite, a precoding based codebook scheme may be used. The receiver may measure a channel state via a received signal and feed a finite number of pieces of preferred precoding matrix information (that is, the indices of the precoding matrices) back to the transmitter based on the above-described codebook information. For example, the receiver may measure the received signal using a maximum likelihood (ML) or minimum mean square error (MMSE) method and select an optimal precoding matrix. Although FIG. 6 shows the case in which the receiver transmits precoding matrix information on a per codeword basis, the present invention is not limited thereto.

The transmitter, which has received feedback information from the receiver, may select a specific precoding matrix from the codebook based on the received information. The transmitter, which has selected the precoding matrix, may perform precoding by multiplying layer signals corresponding in number to transmission rank by the selected precoding matrix and transmit the precoded signal via a plurality of antennas. In the precoding matrix, the number of rows is equal to the number of antennas and the number of columns is equal to the rank value. Since the rank value is equal to the number of layers, the number of columns is equal to the number of layers. For example, if the number of transmit antennas is 4 and the number of transmit layers is 2, a 4×2 precoding matrix may be configured. Information transmitted via the layers may be mapped to the antennas via the precoding matrix.

The receiver, which has received the signal precoded and transmitted by the transmitter, may perform an inverse process of precoding performed by the transmitter to restore a received signal. In general, the precoding matrix satisfies a unitary matrix (U) condition such as $U*U^H=I$ and the inverse process of precoding may be performed by multiplying a Hermitian matrix ($P^H$) of the precoding matrix P used for precoding of the transmitter by the received signal.

For example, Table 4 below shows a codebook used for downlink transmission using 2 transmit antennas in 3GPP LTE release-8/9 and Table 5 below shows a codebook used for downlink transmission using 4 transmit antennas in 3GPP LTE release-8/9.

TABLE 4

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5 above, $W_n^{\{s\}}$ is obtained by a set $\{s\}$ composed of an equation $W_n = I - 2u_n u_n^H / u_n^H u_n$. At this time, I denotes a 4×4 unitary matrix and $u_n$ denotes a value given in Table 5.

As shown in Table 4 above, a codebook for 2 transmit antennas has a total of 7 precoding vectors/matrices. Since a unitary matrix is for an open-loop system, the total number of precoding vectors/matrices for precoding of a closed-loop system is 6. In addition, a codebook for 4 transmit antennas shown in Table 5 above has a total of 64 precoding vectors/matrices.

Such a codebook has common properties such as a constant modulus (CM) property, a nested property and a constrained alphabet property. The CM property means that elements of all precoding matrices in the codebook do not include "0" and have the same size. The nested property means that a precoding matrix having a low rank is designed to be composed of a subset of specific columns of a precoding matrix having a high rank. The constrained alphabet property means that the elements of all the precoding matrices in the codebook are constrained. For example, the elements of the precoding matrix may be constrained to only an element ±1 used for binary phase shift keying (BPSK), an element ±1, ±j used for quadrature phase shift keying (QPSK) or an element ±1, ±j, $$\pm \frac{(1+j)}{\sqrt{2}}, \pm \frac{(-1+j)}{\sqrt{2}}$$

used for 8-PSK. The example of the codebook of Table 5 above may have the constrained alphabet property since the letters of the elements of all the precoding matrices in the codebook are composed of $$\left\{ \pm 1, \pm j, \pm \frac{(1+j)}{\sqrt{2}}, \pm \frac{(-1+j)}{\sqrt{2}} \right\}.$$

Multi-Antenna Configuration

Figure 7:
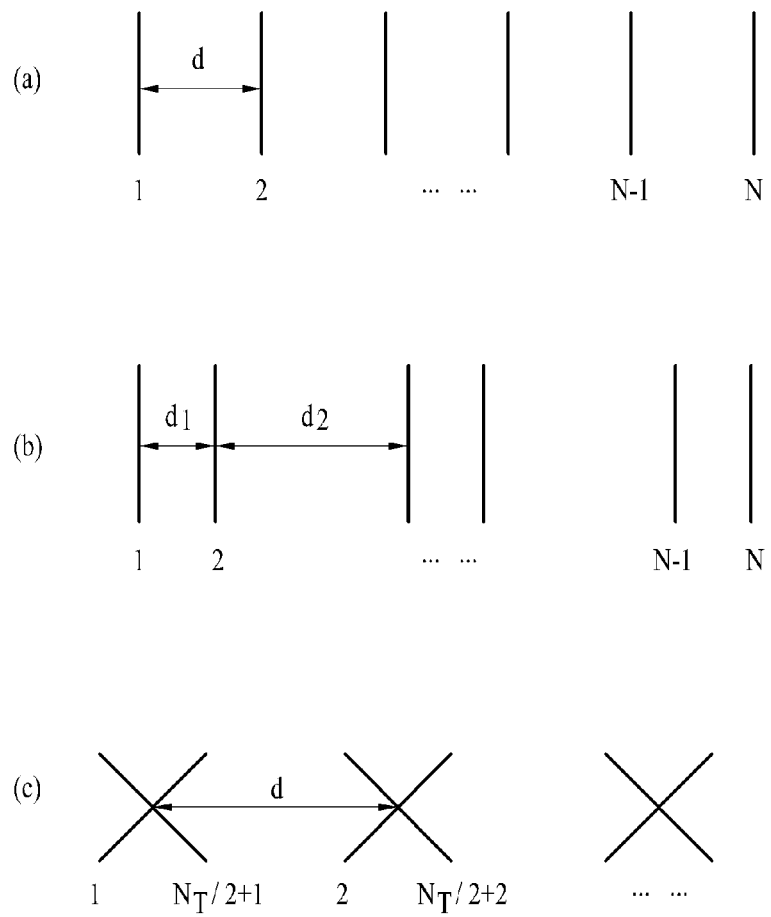
FIG. 7 is a diagram showing the configuration of 8 transmit (Tx) antennas.

FIG. 7 is a diagram showing the configuration of 8 transmit (Tx) antennas.

FIG. 7(a) shows the case in which N antennas configure independent channels without grouping, which is generally referred to as a uniform linear array (ULA). If the number of antennas is small, such a ULA may be used. However, if the number of antennas is large, a space of a transmitter and/or a receiver may be insufficient when a plurality of antennas is arranged to be separated from each other to configure independent channels.

FIG. 7(b) shows a paired ULA in which two antennas forms a pair. In this case, an associated channel is present between the paired antennas and different pairs of antennas may have independent channels.

In legacy 3GPP LTE Release-8/9, four transmit antennas are used in downlink. However, after a 3GPP LTE Release-10 system, 8 transmit antennas may be used in downlink. In order to apply an extended antenna configuration, several transmit antennas should be mounted in a small space. Thus, the ULAs shown in FIGS. 7(a) and 7(b) are not suitable. Accordingly, as shown in FIG. 7(c), a dual-pole (or cross-pole or cross polarization structure) antenna configuration may be applied. If such a transmit antenna configuration is used, although a distance d between antennas is relatively short, antenna correlation may be low to configure independent channels. Therefore, high data transmission throughput can be obtained.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc.

Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 6 below.

TABLE 6

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 6, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 7 below shows the mode of the UE when the CQI, the PMI and the RI are transmitted via the PUSCH.

TABLE 7

| | | PMI feedback type | | |
|---|---|---|---|---|
| | | No PMI | Single PMI | Multiple PMIs |
| PUSCH CQI feedback type | Wideband (wideband CQI) | | | Mode 1-2 |
| | UE selection (subband CQI) | Mode 2-0 | | Mode 2-2 |
| | Higher layer | Mode 3-0 | Mode 3-1 | |

TABLE 7-continued

| | PMI feedback type | | |
|---|---|---|---|
| | No PMI | Single PMI | Multiple PMIs |
| configuration (subband CQI) | | | |

The transmission mode of Table 7 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 8 below.

TABLE 8

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 8. Referring to Table 8, in Mode 2-0 and Mode 2-1, a bandwidth (BP) part is a set of subbands continuously located in a frequency domain and may cover a system bandwidth or a specified set S. In Table 8, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 2: A wideband CQI and a PMI (WB-CQI/PMI) are transmitted.

iii) Type 3: An RI is transmitted.

iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 8, the transmission periodicity of the wideband CQI/PMI and the subband CQI is P and has the following properties.

The wideband CQI/PMI has periodicity of H*P. At this time, H=J*K+1, wherein J denotes the number of BPs and K denotes the number of periodicities of the BP. That is, the UE performs transmission at {0, H, 2H, ...}.

The CQI is transmitted at a time of J*K rather than when the wideband CQI/PMI is transmitted.

In Table 8, the transmission periodicity of the RI is a multiple m of that of the wideband CQI/PMI and has the following properties.

The offsets of the RI and the wideband CQI/PMI are 0 and, if the RI and the wideband CQI/PMI are transmitted in the same subframe, the wideband CQI/PMI is not transmitted.

Parameters P, H, K and O described in Table 8 are all determined at the higher layer of the UE and signaled to a physical layer of the UE.

Hereinafter, a feedback operation according to the mode of the UE will be described with reference to Table 8. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

In addition to estimation (CSI reporting) of the channel state between the BS and the UE, for reduction of an interference signal and demodulation of a signal transmitted between the BS and the UE, various reference signals (RSs) are transmitted between the BS and the UE. The reference signal means a predefined signal having a special waveform, which is transmitted from the BS to the UE or from the UE to the BS and is known to the BS and the UE, and is also referred to as pilot. In 3GPP LTE release 8 (hereinafter, Rel-8), a cell specific reference signal (CRS) is proposed for the purpose of channel measurement of CQI feedback and demodulation of a physical downlink shared channel (PDSCH). However, after 3GPP LTE release 10 (hereinafter, Rel-10), separately from the CRS of Rel-8, a channel state information-reference signal (CSI-RS) for CSI feedback is proposed according to Rel-10.

Each BS may transmit a CSI-RS for channel measurement to the UE via a plurality of antenna ports and each UE may calculate channel state information based on the CSI-RS and transmit the channel state information to each BS in response thereto.

In an advanced wireless communication system such as 3GPP LTE-A, a multi-user MIMO scheme is supported in order to obtain multi-user gain. In MU-MIMO, an interference channel is present between UEs multiplexed in a spatial domain, accuracy of a feedback channel of the UE influences not only performance of the UE which performs feedback but also interference in the multiplexed UE and thus higher accuracy is required from the viewpoint of channel feedback. In a 3GPP LTE-A system, in order to increase feedback channel accuracy, a final precoding matrix indicator (PMI) is designed to be divided into $W^{(1)}$ having a long-term and wideband property and $W^{(2)}$ having a short-term and subband property. At this time, as an example of a method of determining a final PMI, hierarchical codebook transformation such as W=norm $(W^{(1)}W^{(2)})$ may be performed using two pieces of channel information. Here, norm(A) means normalization for enabling a norm value of each column of a matrix A to become 1.

For example, an 8Tx codebook for eight transmit antennas defined in a 3GPP LTE-A system is designed as a codebook having a dual structure from the viewpoint of the above-described hierarchical codebook design and may be expressed by the following equation.

$$W^{(1)}(i) = \begin{bmatrix} X_i & 0 \\ 0 & X_i \end{bmatrix},$$ [Equation 12]

where $X_i$ is Nt/2 by M matrix.

$$W^{(2)}(j) = \overbrace{\begin{bmatrix} e_M^k & e_M^l & e_M^m \\ & \cdots & \\ \alpha_j e_M^k & \beta_j e_M^l & \gamma_j e_M^m \end{bmatrix}}^{r\ columns}$$

(if rank = r), where $1 \leq k, l, m \leq M$ and $k, l, m$ are integer.

where, $W^{(1)}(i)$ and $W^{(2)}(j)$ denote matrices for i-th and j-th codewords in codeword sets for $W^{(1)}$ and $W^{(2)}$, respectively. In general, in an antenna, antenna elements are located on the same line in the form of a uniform linear array (ULA) and, at this time, a constant interval proportional to a wavelength is maintained between two adjacent antenna elements. Alternatively, an antenna having a cross polarization property may be configured using a wave polarization property. That is, an antenna element having a vertical polarization property and an antenna element having a horizontal polarization property may be located at the same position and thus spatial efficiency is excellent when an antenna array is physically configured.

In a 3G-PP LTE-A system, when the 8Tx codebook is designed, the cross polarization antenna is used and, when an interval between the antennas is small, that is, when the distance between the adjacent antennas is equal to or less than half a signal wavelength, a relative phase difference between channels is applied. The cross polarization antenna may be divided into an antenna group having a horizontal polarization property and an antenna group having a vertical polarization property. Each antenna group has a ULA antenna property and the antenna elements of the two antenna groups are located at the same positions. In general, when a channel is modeled in terms of a line of sight (LOS), the same linear phase difference is present between antenna channels in each group having the vertical or horizontal polarization property and only the phase differ between the antenna channel groups having different polarization properties. At this time, since the codebook is expressed by quantizing the channel, the property of the channel may be maximally applied to design the codebook. For example, in case of a rank 1 codeword, for example, such a channel property is applied to a codeword satisfying the following equation.

$$W^{(1)}(i) * W^{(2)}(j) = \begin{bmatrix} X_i(k) \\ \alpha_j X_i(k) \end{bmatrix} \quad \text{[Equation 13]}$$

In the above-described equation, the codeword is expressed by a vector of $N_t \times 1$ and $N_t$ denotes the number of transmit antenna ports. In addition, a high-level vector $X_i(k)$ and a low-level vector $\alpha_j X_i(k)$ are included and indicate an antenna group having a horizontal polarization property and an antenna group having a vertical polarization property, respectively. $X_i(k)$ is expressed by a vector having a linear phase difference property between the antennas of each antenna group. As a representative example thereof, a discrete Fourier transform (DFT) matrix may be used. In addition, $\alpha_j$ denotes a phase difference between antenna groups having different polarization properties.

Meanwhile, recently, in a system after 3GPP LTE Rel-12, even in the case of using four transmit antennas, a more sophisticated codebook needs to be designed in order to improve MU-MIMO performance and an improved 4Tx codebook has been discussed. As an example of the improved 4Tx codebook, a codebook having a dual structure has been discussed similarly to the 8Tx codebook structure. That is, when a codebook set for $W^{(1)}$ indicating the wideband and long-term channel and a codeword set for $W^{(2)}$ indicating the subband and short-term channel are present, a 4Tx codebook in which a final codeword is defined as $W=W^{(1)}W^{(2)}$ has been discussed. At this time, the codeword for $W^{(1)}$ is determined by selecting one codeword $C^{(i)}(k)$ from a codeword set and $C^{(1)}$ is defined by the following equation.

$$C^{(1)} \left\{ \begin{bmatrix} \tilde{W}^{(1)} & 0 \\ 0 & \tilde{W}^{(1)} \end{bmatrix} \right\} \quad \text{[Equation 14]}$$

$$\tilde{W}^{(1)} = [\tilde{w}_{2k \bmod 16} \ \tilde{w}_{(2k+1) \bmod 16} \ \tilde{w}_{(2k+2) \bmod 16} \ \tilde{w}_{(2k+3) \bmod 16}],$$

$$k = 0, 1, \ldots, 7 \Bigg\}$$

where $$\tilde{w}_n = \begin{bmatrix} 1 \\ e^{j\frac{2\pi n}{16}} \end{bmatrix},$$

$$n = 0, 1, \ldots, 15$$

At this time, the codeword set for $W^{(2)}$ may be expressed by a combination of two codeword sets. More specifically, codeword set for $W^{(2)}$ is defined by four codeword sets expressed by $C_1^{(2)}$ and $Y$ of the following equation in case of rank 1 and defined by two codeword sets expressed by $C_2^{(2)}$ and $(Y_1, Y_2)$ of the following equation in case of rank 2.

$$C_1^{(2)} = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\} \quad \text{[Equation 15]}$$

$$Y \in \{e_1, e_2, e_3, e_4\}$$

$$C_2^{(2)} = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\} \quad \text{[Equation 16]}$$

$$(Y_1, Y_2) \in \{(e_1, e_1), (e_2, e_2), (e_3, e_3),$$
$$(e_4, e_4), (e_1, e_2), (e_2, e_3), (e_1, e_4), (e_2, e_4)\}$$

where, $e_n$ denotes a vector for selecting one of four elements, in which only an n-th element has a value of 1 and the remaining elements have a value of 0.

The codebook of the dual structure is designed for the purpose of the cross polarization property in the 8Tx codebook. However, in the 4Tx codebook applied to the legacy 3GPP LTE system, a ULA antenna structure in which four transmit antennas to which the above-described codebook is applied have the co-polarization property is considered. Accordingly, if the 8Tx codebook designed for the antenna structure having the cross polarization property is reduced and applied to the 4Tx codebook, when a BS uses four transmit antennas in the ULA structure having the co-polarization property, performance may be less improved as compared to the legacy 3GPP LTE Rel-8 4Tx codebook. This is because, when the improved codebook defined by Equations 14 to 16 is applied, a codeword having a linear phase difference, which is the feature of the co-polarization ULA antenna structure, is not present. In order to resolve this problem, when a first codeword of a $C_j^{(2)}$ codeword set, that is, $[Y\ Y]^T$ at $C_0^{(2)}$ or $[Y_1\ Y_2; Y_1\ -Y_2]$ at $C_2^{(2)}$, is selected and a codeword of a Y or $(Y_1, Y_2)$ codeword set is arbitrarily selected, a codeword set $C'^{(1)}$ for $W^{(1)}$ for enabling a finally derived codeword to have a linear phase increase property may be considered. $C'^{(1)}$ may be expressed by the following equation.

$$C'^{(1)} = \left\{ \begin{bmatrix} \tilde{W}^{(1)} & 0 \\ 0 & \tilde{W}^{(1)} D_a \end{bmatrix} \right\} \quad \text{[Equation 17]}$$

$$\tilde{W}^{(1)} = [\tilde{w}_{2k \bmod 16} \ \tilde{w}_{(2k+1) \bmod 16} \ \tilde{w}_{(2k+2) \bmod 16} \ \tilde{w}_{(2k+3) \bmod 16}],$$

$$k = 0, 1, \ldots, 7 \Bigg\}$$

where $$\tilde{w}_n = \begin{bmatrix} 1 \\ e^{j\frac{2\pi n}{16}} \end{bmatrix},$$

$$n = 0, 1, \ldots, 15$$

$$D_a = \begin{bmatrix} a_0 & 0 & 0 & 0 \\ 0 & a_1 & 0 & 0 \\ 0 & 0 & a_2 & 0 \\ 0 & 0 & 0 & a_3 \end{bmatrix},$$

$$a_n = e^{2 \cdot j \frac{2\pi}{16} \cdot ((2k+n) \bmod 16)}$$

where, a matrix $D_a$ serves to enable a final codeword to always have a linear phase increase property when a first codeword of a $C_j^{(2)}$ codeword set, that is, $[Y\ Y]^T$ at $C_1^{(2)}$ or $[Y_1\ Y_2; Y_1\ -Y_2]$ at $C_2^{(2)}$, is selected and an arbitrary codeword of a Y or $(Y_1, Y_2)$ codeword set is selected. In the above example, in terms of the role of each codebook, the $C'^{(1)}$ codebook set indicates a set of adjacent beam directions applicable to two antenna groups and a beam is expressed using a DFT matrix having a linear phase increase property of the co-polarization ULA in each antenna group.

In contrast, the $C_1^{(2)}$ or $C_2^{(2)}$ codeword set indicates a phase difference between two antenna groups and Y or $(Y_1, Y_2)$ serves to select beams corresponding in number to rank from among adjacent beam directions corresponding to one codeword in the $C'^{(1)}$ codebook set. Accordingly, it can be seen that only the $C_1^{(2)}$ or $C_2^{(2)}$ codeword set has a cross polarization antenna property. However, as described above, if four transmit antennas are used, a probability that the antenna structure has the co-polarization ULA is relatively high and, at this time, the utility of the $C_1^{(2)}$ or $C_2^{(2)}$ codeword set may be insignificant.

The following table shows the high-level codebooks according to Equations 15 to 17 with respect to an $i_1$-th codeword for $W^{(1)}$ and an $i_2$-th codeword for $W^{(2)}$ in case of rank 1 and rank 2. In the following table, $\phi_{n,m} = e^{j\pi(n/2 + m/4)}$, $v_m = [1\ e^{j2\pi m/16}]^T$ and Table 9 shows rank=1 and Table 10 shows rank=2.

TABLE 9

| | $i_2$ | | | |
|---|---|---|---|---|
| $i_1$ | 0 | 1 | 2 | 3 |
| 0-7 | $W_{2i_1,0}^{(1)}$ | $W_{2i_1,1}^{(1)}$ | $W_{2i_1,2}^{(1)}$ | $W_{2i_1,3}^{(1)}$ |
| $i_1$ | 4 | 5 | 6 | 7 |
| 0-7 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| $i_1$ | 8 | 9 | 10 | 11 |
| 0-7 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |
| | 12 | 13 | 14 | 15 |
| 0-7 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{4}} \begin{bmatrix} v_m \\ \varphi_{n,m} v_m \end{bmatrix}$

TABLE 10

| | $i_2$ | | | |
|---|---|---|---|---|
| $i_1$ | 0 | 1 | 2 | 3 |
| 0-7 | $W_{2i_1,2i_1,0}^{(2)}$ | $W_{2i_1,2i_1,1}^{(2)}$ | $W_{2i_1+1,2i_1,0}^{(2)}$ | $W_{2i_1+1,2i_1+1,1}^{(2)}$ |
| $i_1$ | 4 | 5 | 6 | 7 |
| 0-7 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| $i_1$ | 8 | 9 | 10 | 11 |
| 0-7 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| $i_1$ | 12 | 13 | 14 | 15 |
| 0-7 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4} \begin{bmatrix} v_m & v_{m'} \\ \varphi_{n,m} v_m & -\varphi_{n,m'} v_{m'} \end{bmatrix}$ Change in phase of a channel corresponding to each antenna port is proportional to a frequency and time delay. However, in an actual MIMO system, time delay values of the channels differ between antenna ports due to implementation problems. If time delay values differ between antenna ports, the phase values of the channels of the antenna ports are differently changed according to frequency and, as a result, the beam directions of the antenna ports are frequency-selectively changed. In a 3GPP LTE Rel-12 system, in order to compensate for change in the frequency-selective beam direction, a method of feeding back PMI information according to subband on a frequency axis has been discussed. However, if the PMI information is fed back according to subband, feedback overload may occur. In particular, feedback overhead according to feedback per subband may become important if an improved 4Tx codebook in Rel-12 in which the amount of information to be fed back is greater than that of the legacy Rel-8 codebook is introduced. At this time, the improved 4Tx codebook needs to be compressed via sub-sampling.

Accordingly, in one embodiment of the present invention, in a process of sub-sampling the 4Tx codebook, a method of sub-sampling a preferred codeword set or codeword according to priority based on antenna polarization supported by a BS when the 4Tx codebook has a multi-structure composed of a plurality of codeword sets and the codeword sets are divided into codeword sets supporting a co-polarization antenna structure and codeword sets supporting a cross polarization antenna structure is proposed. Hereinafter, in the embodiment of the present invention, assume that the improved 4Tx codebook defined as the high-level codebook before performing sub-sampling based on the 3GPP LTE system is composed of the codeword set $C'^{(1)}$ of Equation 17 and the codeword set $C_1^{(2)}$ and Y or $C_2^{(2)}$ and $(Y_1, Y_2)$ of Equations 15 to 16. Hereinafter, detailed operation of the present invention will be described and the operation of the embodiment is applicable to an arbitrary wireless communication system using a codebook in which a final codeword property may be identified according to polarization property.

First Embodiment

Sub-Sampling Method According to Codeword Set

When a multi-structure codebook composed of two or more codeword sets according to one embodiment of the present invention is used and sub-sampling is performed in order to reduce feedback overhead, a method of assigning priority to a specific codeword set with respect to the entire codebook according to antenna structure and performing sub-sampling will be described. In the improved 4Tx codebook according to Equations 15 and 16 as the high-level codebook before performing sub-sampling according to the embodiment of the present invention, codewords in the $C_j^{(2)}$ codeword set excluding a first codeword in a codeword set expressed by $C_j^{(2)}$, that is, $[Y\ Y]^T$ at $C_1^{(2)}$ or $[Y_1\ Y_2; Y_1\ -Y_2]$ at $C_2^{(2)}$, are defined in order to apply a phase difference between an antenna group having a horizontal polarization property and an antenna group having a vertical polarization property in a cross polarization antenna structure. Accordingly, if a BS uses the co-polarization antenna, in a process of performing sub-sampling with respect to the final codewords, the $C_1^{(2)}$ or $C_2^{(2)}$ codeword set may be sub-sampled such that only the first codeword of the codeword set is left and the remaining codewords are excluded. As the result of performing sub-sampling according to the above-described example, a sub-codebook expressed by Equation 17 and the following equation is derived.

$$C_1^{(2)} = \left\{ \begin{bmatrix} Y \\ Y \end{bmatrix} \right\}$$ [Equation 18]

$Y \in \{e_1, e_2, e_3, e_4\}$ $$C_2^{(2)} = \left\{ \begin{bmatrix} Y_1 & Y_2 \\ Y_1 & -Y_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$

The following table shows the sub-codebook according to Equations 17 and 18 with respect to an $i_1$th codeword for $W^{(1)}$ and an $i_2$-th codeword for $W^{(2)}$ in case of rank 1 and rank 2. Here, $\phi_m = e^{j\pi m/4}$, $v_m = [1 \; e^{j2\pi m/16}]^T$ and Table 11 shows rank=1 and Table 12 shows rank=2.

TABLE 11

| $i_1$ | $i_2$ | | | |
|---|---|---|---|---|
| | 0 | 1 | 2 | 3 |
| 0-7 | $W_{2i_1}^{(1)}$ | $W_{2i_1+1}^{(1)}$ | $W_{2i_1+2}^{(1)}$ | $W_{2i_1+3}^{(1)}$ | where $W_m^{(1)} = \frac{1}{\sqrt{4}} \begin{bmatrix} v_m \\ \varphi_m v_m \end{bmatrix}$

TABLE 12

| $i_1$ | $i_2$ | | | | | | | |
|---|---|---|---|---|---|---|---|---|
| | 0 | 1 | 2 | 3 | 4 | 5 | 6 | 7 |
| 0-7 | $W_{2i_1,2i_1}^{(2)}$ | $W_{2i_1+1,2i_1+1}^{(2)}$ | $W_{2i_1+2,2i_1+2}^{(2)}$ | $W_{2i_1+3,2i_1+3}^{(2)}$ | | | | |

In contrast, if the BS uses a cross polarization antenna, the utility of the $C_1^{(2)}$ or $C_2^{(2)}$ codeword set may be increased and the utility of the Y codeword set at rank 1 or the $(Y_1, Y_2)$ codeword set at rank 2 may be decreased. At this time, the entire codebook may be sub-sampled so as to exclude Y or $(Y_1, Y_2)$. The sub-codebook derived as the result of the process of performing sub-sampling is expressed by Equation 17 and the following equation.

$$C_1^{(2)} = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\}$$ [Equation 19]

$Y \in \{e_1\}$ $$C_2^{(2)} = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\}$$

$(Y_1, Y_2) \in \{(e_1, e_1)\}$

At this time, assume that the UE uses a first codeword or a default codeword with respect to the excluded codeword set. In addition, the BS may inform the UE whether each codeword set is used for feedback via a higher layer signal such as RRC.

The following table shows the high-level codebook according to Equations 17 and 19 with respect to an $i_1$-th codeword for $W^{(1)}$ and an $i_2$-th codeword for $W^{(2)}$ in case of rank 1 and rank 2. Here, $\phi_{n,m} = e^{j\pi(n/2+m/4)}$, $v_m = [1 \; e^{j2\pi m/16}]^T$ and Table 13 shows rank=1 and Table 14 shows rank=2.

TABLE 13

| $i_1$ | $i_2$ | | | |
|---|---|---|---|---|
| | 0 | 1 | 2 | 3 |
| 0-7 | $W_{2i_1,0}^{(1)}$ | $W_{2i_1,1}^{(1)}$ | $W_{2i_1,2}^{(1)}$ | $W_{2i_1,3}^{(1)}$ | where $W_{m,n}^{(1)} = \frac{1}{\sqrt{4}} \begin{bmatrix} v_m \\ \varphi_{n,m} v_m \end{bmatrix}$

TABLE 14

| $i_1$ | $i_2$ | |
|---|---|---|
| | 0 | 1 |
| 0-7 | $W_{2i_1,2i_1,0}^{(2)}$ | $W_{2i_1,2i_1,1}^{(2)}$ | where $W_{m,m',n}^{(2)} = \frac{1}{4} \begin{bmatrix} v_m & v_{m'} \\ \varphi_{n,m} v_m & -\varphi_{n,m'} v_{m'} \end{bmatrix}$ Second Embodiment Sub-Sampling Method According to Codeword When a multi-structure codebook composed of two or more codeword sets according to the embodiment of the present invention is used and sub-sampling is performed in order to reduce feedback overhead, a method of assigning priority to a specific codeword according to antenna structure with respect to the entire codebook and performing sub-sampling will be described. Hereinafter, the improved codebook expressed by Equation 14 and Equation 17 is assumed.

When the BS uses a co-polarization antenna structure, similarly to the method of assigning priority to the specific codeword set and performing sub-sampling according to the operation of the present invention, even in the operation of the present invention in which priority is given to the codeword, low priority is given to final codewords on a final codebook in which codewords in the $C_j^{(2)}$ codeword set excluding a first codeword in a codeword set expressed by $C_1^{(2)}$, that is, $[Y Y]^T$ at $C_1^{(2)}$ or $[Y_1 \; Y_2; Y_1 \; -Y_2]$ at $C_2^{(2)}$, are involved, such that the final codewords may be excluded in the sub-sampling process. However, unlike exclusion of the codeword set, priority may be given to the codeword to perform a more sophisticated sub-sampling process. For example, in an example to which the co-polarization antenna structure is applied, even after the codewords excluding the first codeword in the $C_1^{(2)}$ or $C_2^{(2)}$ codeword set are excluded, the number of codewords on the final codebook needs to be further reduced due to restriction in the number of feedback bits. At this time, priority may be further given to codewords in Y or $(Y_1, Y_2)$ which is the codeword set for selecting beams corresponding in number to rank from among adjacent beam directions corresponding to one codeword of $C^{(1)}$, that is, codewords expressed by $e_n$ or $(e_n, e_m)$. For example, if it is assumed that the codewords in the codeword set $C_1^{(2)}$ excluding $[Y \; Y]^T$ are excluded with respect to $C_1^{(2)}$ in case of rank 1, 32 final codewords occur by a combination of 8 codewords expressed by the codeword set $C'^{(1)}$ and four codewords in the codeword set Y. At this time, the number of final codewords having a unique value is only 16 and the remaining 16 codewords have values overlapping those of the existing 16 codewords. At this time, the reason why the overlapping final codewords occur is because adjacent beam directions corresponding to specific codewords in the codeword set $C'^{(1)}$ and adjacent beam directions corresponding to codewords of consecutive indices partially overlap. Although the overlapping beam directions are introduced in order to prevent the beam directions from being suddenly changed, thus reducing performance deterioration, the effects are not relatively significant and thus relatively low priority may be given to codewords in the Y and $(Y_1, Y_2)$ codeword set for selecting overlapping beam directions. For example, in case of rank 1, the codewords in Y corresponding to the overlapping beams between the codewords within the $C'^{(1)}$ codeword set may be excluded in the sub-sampling process. The final codebook according to the sub-sampling process may be expressed by Equation 17 and the following equation.

$$C_1^{(2)} = \left\{ \begin{bmatrix} Y \\ Y \end{bmatrix} \right\} \qquad \text{[Equation 20]}$$

$$Y \in \{e_1, e_2\}$$

The following table shows the sub-codebook according to Equations 17 and 20 with respect to an $i_1$-th codeword for $W^{(1)}$ and an $i_2$-th codeword for $W^{(2)}$ in case of rank 1. Here, $\phi_m = e^{j\pi m/4}$, $v_m = [1 \; e^{j2\pi m/16}]^T$.

TABLE 15

| $i_1$ | $i_2$ | |
|---|---|---|
|  | 0 | 1 |
| 0-7 | $W_{2i_1}^{(1)}$ | $W_{2i_1+1}^{(1)}$ |

$$\text{where } W_m^{(1)} = \frac{1}{\sqrt{4}} \begin{bmatrix} v_m \\ \varphi_m v_m \end{bmatrix}$$

Alternatively, when the BS uses a cross polarization antenna, if sub-sampling is performed in units of codeword sets, as shown in Equation 17 and 19, the entire codebook may be sub-sampled to exclude codewords related to Y or $(Y_1, Y_2)$. However, unlike the case in which priority is given in units of codeword sets, if sub-sampling is performed in units of codewords, because feedback capacity is sufficient, some of the codewords related to Y or $(Y_1, Y_2)$ may be included. For example, in case of rank 2, a codeword composed of different vectors among the codewords of $(Y_1, Y_2)$ considers the fact that ULA channels differ between antenna groups having horizontal and vertical polarization properties in terms of the cross polarization antenna property, but the utility thereof is relatively low because a probability that channels of the two antenna groups are similar is high. Accordingly, if feedback capacity is sufficient, the entire codebook may be sub-sampled by adding only codewords composed of the same vector among the codewords of $(Y_1, Y_2)$. The following equation shows the above example and, when codewords are added to $(Y_1, Y_2)$, overlapping codewords of the codewords composed of the same vectors are excluded.

$$C_2^2 = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\} \qquad \text{[Equation 21]}$$

$$(Y_1, Y_2) \in \{(e_1, e_1), (e_2, e_2)\}$$

The following table shows the sub-codebook according to Equations 17 and 21 with respect to an $i_1$-th codeword for $W^{(1)}$ and an $i_2$-th codeword for $W^{(2)}$ in case of rank 2. Here, $\phi_m = e^{j\pi m/4}$, $v_m = [1 \; e^{j2\pi m/61}]^T$.

TABLE 16

| $i_1$ | $i_2$ | | | |
|---|---|---|---|---|
|  | 0 | 1 | 2 | 3 |
| 0-7 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

$$\text{where } W_{m,m',n}^{(2)} = \frac{1}{4} \begin{bmatrix} v_m & v_{m'} \\ \varphi_{n,m} v_m & -\varphi_{n,m'} v_{m'} \end{bmatrix}$$

Third Embodiment

Codeword Signaling Method Used by BS

When a multi-structure codebook composed of two or more codeword sets according to one embodiment of the present invention is used, a method of, at the BS, informing the UE of the kind of a used codebook according to an actual antenna structure via a semi-static signal will be described. If sub-sampling is performed according to the operation of one embodiment of the present invention in a situation in which feedback is restricted, the sub-sampling result may be changed depending on whether the antenna structure of the BS is a co-polarization antenna or cross polarization antenna. In the above-described environment, the BS may define different sub-sampling results as separate sub-codebooks in order to relatively easily perform codebook optimization suitable for the antenna structure and inform the UE of the kind of a currently used sub-codebook via a higher layer signal such as RRC. In addition, the BS may inform the UE of at least one of an entire Rel-8 4Tx codebook, a sub-codebook obtained by sub-sampling the improved 4Tx codebook according to a co-polarization antenna structure, a sub-codebook obtained by sub-sampling the improved 4Tx codebook according to a cross polarization antenna structure or an improved 4Tx codebook, which is not sub-sampled, via a higher layer signal in a semi-static manner.

Fourth Embodiment

Method of Linking Used Codeword and Feedback Process

A method of linking a feedback process, to which a signal indicating whether a specific codeword set according to an embodiment of the present invention is used is applied, and a feedback reference signal will be described. In 3GPP LTE Rel-11, as a coordinated multiple point transmission (CoMP) scheme is introduced, the UE receives a service from an arbitrary transmission point participating in the CoMP scheme. At this time, antenna structures used by the arbitrary transmission point for 4Tx based data transmission may differ between transmission points. Accordingly, according to the operation of the present invention, when sending information about whether the specific codeword set is used according to the antenna structure, information indicating with which feedback process or feedback reference signal the corresponding information is linked should be included. For example, in a 3GPP LTE-A system, a CSI process is defined for estimation of channel state information (CSI) for a BS or a transmission point and the CSI process includes a CSI-reference signal (RS) for channel estimation and CSI-interference measurement (IM) for interference measurement. At this time, according to the operation of the present invention, when the BS informs the UE of information about whether codeword sets are used or a specific codeword is used, the UE may be informed of information indicating with which CSI process or CSI-RS resources the corresponding information is linked via a CSI process index or CSI-RS resource index.

The codebooks according to the antenna structure may be sub-codebooks generated in different sub-sampling processes for a high-level codebook according to one embodiment of the present invention or codebooks having different structures supported by the BS.

When a plurality of codebooks is supported by the BS according to one embodiment of the present invention, a method of, at the BS, allocating two or more CSI processes to the UE, enabling the two or more CSI processes to refer to the same CSI-RS or CSI-IM and performing feedback using different codebooks according to CSI process will be described. In the channel feedback process, if feedback using different codebooks is performed with respect to one downlink channel, the BS may obtain a more accurate channel direction by performing interpolation using different feedback information. In order to obtain such advantages, two or more CSI processes corresponding to the same transmission point may be specified and sub-codebooks corresponding to the CSI processes are differently set to instruct the UE to perform channel feedback based on different codebooks with respect to the same channel.

More specifically, in the present invention, a method of setting two or more CSI processes corresponding to a single BS or a single transmission point, utilizing the same CSI-RS or the same CSI-IM between CSI processes, and differently setting the kind of the codebook according to CSI process is proposed. At this time, the codebooks may be sub-codebooks generated in different sub-sampling process for a high-level codebook according to the operation of one embodiment of the present invention. Alternatively, if a plurality of codebooks supported by the BS is present, some codebooks may be selected and applied. At this time, the BS may instruct the UE to perform the feedback process with respect to some of the CSI processes sharing the same CSI-RS and CSI-IM via a higher layer signal such as RRC. Alternatively, the UE may select CSI processes from among the CSI processes in ascending order of quantization error occurring according to use of the codebook via a specific RRC signal and perform the feedback process by the number restricted by the BS.

Fifth Embodiment

Method of Specifying Number of Sub-Sampled Codebooks

A method of enabling codebooks generated according to a sub-sampling process to have the same number of codewords with respect to two or more codeword sets according to a multi-structure according to another embodiment of the present invention will be described. According to the embodiment of the present invention, assume that there is a codebook of a dual structure, that is, a codebook for $W^{(1)}$ and a codebook for $W^{(2)}$. If sub-sampling according to antenna structure or specific channel environment is performed according to the operation of one embodiment of the present invention, sub-sampling may be performed so as to exclude some codewords of the codebook for $W^{(1)}$ and some codewords of the codebook for $W^{(2)}$.

At this time, if a codebook B generated by performing sub-sampling to apply a co-polarization property and a codebook C generated by performing sub-sampling to apply a cross polarization property are present in a sub-sampling process according to an antenna structure with respect to one codebook A, one embodiment of the present invention proposes a method of enabling the number of codewords in a codebook for $W^{(1)}$ and the number of codewords in a codebook for $W^{(2)}$ to be equal in B and C. The same number of codewords is maintained in order to apply the same coding scheme so as not to change overhead according to sub-sampling in a feedback process for the codeword selected for $W^{(1)}$ and the codeword selected for $W^{(2)}$. The following equation shows an example according to the operation of the present invention. The above-described $W^{(1)}$ and $W^{(2)}$ are briefly referred to as $W_1$ and $W_2$.

5.1. Codebook Size ($W_1$, $W_2$ for Rank 1, $W_2$ for Rank 2=4, 2, 1)

$W_1$ is composed of 16 codewords and each codeword is composed of eight adjacent vectors in a 2×16 DFT matrix oversampled 8 times. $D_a(l)$ is applied to $W_1$ such that each vector of a final codeword has a linear phase increase property in a co-polarization antenna. $W_1$ shares the same codebook regardless of the co-polarization structure and the cross polarization structure. Seven vectors of $\tilde{W}_1(l)$ overlap between adjacent codewords of $W_1$. Accordingly, the UE may more accurately update $W_1$ via feedback.

$W_2$ of the cross polarization structure is configured to have four phase compensation values (1, −1, j, −j) in order to compensate for a phase difference between a vertical antenna group and a horizontal antenna group at rank 1. In the cross polarization structure, a selection value is fixed to $e_1$ such that only a phase compensation value is changed in short-term or subband units. This is because 2 bits corresponding to the codebook size of $W_2$ are all used for phase compensation to obtain good performance in consideration of tradeoff between performance obtained by the selection value and performance obtained by phase compensation in the cross polarization structure as described above. Since $W_1$ is composed of 16 codewords, a final precoder is composed of one arbitrary vector of a 2×16 DFT matrix oversampled 8 times.

$W_2$ of the cross polarization structure is configured to have two phase compensation values ((1, −1), (j, −j)) in order to compensate for a phase difference between a vertical antenna group and a horizontal antenna group at rank 2. In the cross polarization structure, a selection value is fixed to $e_1$ such that only a phase compensation value is optimally changed in short-term or subband units. This is because 1 bit corresponding to the codebook size of $W_2$ is used for phase compensation to obtain good performance in consideration of tradeoff between performance obtained by the selection value and performance obtained by phase compensation in the cross polarization structure as described above.

$W_2$ of the co-polarization structure is configured to have one phase compensation value (1) in order to compensate for a phase difference between a vertical antenna group and a horizontal antenna group at rank 1. That is, a phase compensation value is not present. In the co-polarization structure, a selection value is composed of ($e_1$, $e_2$, $e_3$, $e_4$) such that only the selection value is optimally changed in short-term or subband units. This is because 2 bits corresponding to the codebook size of $W_2$ are all used as the selection value to obtain good performance in consideration of tradeoff between performance obtained by the selection value and performance obtained by phase compensation in the co-polarization structure as described above.

$W_2$ of the co-polarization structure is configured to have one phase compensation value in order to compensate for a phase difference between a vertical antenna group and a horizontal antenna group at rank 2. That is, a phase compensation value is not present. In the co-polarization structure, a selection value is composed of ($e_1$, $e_5$, $e_3$, $e_7$) such that only the selection value is optimally changed in short-term or subband units. This is because 1 bit corresponding to the codebook size of $W_2$ is used as the selection value to obtain good performance in consideration of tradeoff between performance obtained by the selection value and performance obtained by phase compensation in the co-polarization structure as described above. As the beam vectors of a first layer and a second layer are composed of vectors separated by an interval of 4 among vectors configuring $\tilde{W}_1(l)$, both the beam vectors of the first layer and the second layer have the linear phase increase property when combined with $D_a(l)$. Alternatively, in the co-polarization structure, a selection value may be composed of (($e_1$, $e_5$), ($e_2$, $e_6$)) and correlation between an i-th layer of a final beam selected as (($e_1$, $e_5$)) and an i-th layer of a final beam selected as ($e_2$, $e_6$) is greater than that of the case in which the selection value is composed of (($e_1$, $e_5$), ($e_3$, $e_7$)).

Next, a codebook according to 5.1 will be described. The following tables show an i-th codeword of $W_1$ and a k-th codeword of $W_2$.

---

5.1 Codebook size ($W_1$, $W_2$ for rank 1, $W_2$ for rank 2: 4,2,1)

$$W_1(l) = \begin{bmatrix} \tilde{W}_1(l) & 0 \\ 0 & \tilde{W}_1(l)D_a(l) \end{bmatrix}, l \in \{0, 1, 2, \ldots, 15\}$$

where $\tilde{W}_1(l)$ and the element of $D_a(l)$ at p-th row and q-th column are defined as (p and q start from zero)

$$\tilde{W}_1(l) = [w_{(l)mod16} \quad w_{(l+1)mod16} \quad \cdots \quad w_{(l+6)mod16} \quad w_{(l+7)mod16}],$$

$$w_n = \begin{bmatrix} 1 \\ e^{j\frac{2\pi n}{16}} \end{bmatrix}$$

$$\{D_a(l)\}_{pq} = \begin{cases} e^{2 \cdot j \frac{2\pi \cdot ((1+(p\,mod\,4))mod\,16)}{16}}, & p = q \\ 0, & p \neq q. \end{cases}$$

$W_2$ can be represented for rank 1 as $$W_2(m) = \begin{bmatrix} e_1 \\ e^{j\frac{\pi m}{2}} e_1 \end{bmatrix},$$

$m \in \{0, 1, 2, 3\}$ (for X-pol antenna configuration)

$$W_2(m) = \begin{bmatrix} e_m \\ e_m \end{bmatrix}, m \in \{1, 2, 3, 4\} \text{(for Co-pol antenna configuration)}$$

$W_2$ can be represented for rank 2 as $$W_2(m) = \begin{bmatrix} e_1 & e_1 \\ e^{j\frac{\pi m}{2}} e_1 & -e^{j\frac{\pi m}{2}} e_1 \end{bmatrix}, m \in \{0, 1\}.$$

(for X-pol antenna configuration)

---

5.1 Codebook size ($W_1$, $W_2$ for rank 1, $W_2$ for rank 2: 4,2,1)

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (3, 7)\} \text{ or}$$

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (2, 6)\}.$$

(for Co-pol antenna configuration)

X pol antenna, rank 1 codebook

| i | k | | | |
|---|---|---|---|---|
| | 0 | 1 | 2 | 3 |
| 0-15 | $W_{i,0}^{(1)}$ | $W_{i,1}^{(1)}$ | $W_{i,2}^{(1)}$ | $W_{i,3}^{(1)}$ | where $W_{m,n}^{(1)} = \frac{1}{\sqrt{4}} \begin{bmatrix} v_m \\ a_m \varphi_n v_m \end{bmatrix}$ X pol antenna, rank 2 codebook

| i | k | |
|---|---|---|
| | 0 | 1 |
| 0-15 | $W_{i,i,0}^{(2)}$ | $W_{i,i,1}^{(2)}$ | where $W_{m,m',n}^{(1)} = \frac{1}{\sqrt{8}} \begin{bmatrix} v_m & v_{m'} \\ a_m \varphi_n v_m & -a_m \varphi_n v_{m'} \end{bmatrix}$ Co-pol antenna, rank 1 codebook

| i | k | | | |
|---|---|---|---|---|
| | 0 | 1 | 2 | 3 |
| 0-15 | $W_{i,0}^{(1)}$ | $W_{i+1,0}^{(1)}$ | $W_{i+2,0}^{(1)}$ | $W_{i+3,0}^{(1)}$ | where $W_{m,n}^{(1)} = \frac{1}{\sqrt{4}} \begin{bmatrix} v_m \\ a_m \varphi_n v_m \end{bmatrix}$ Co-pol antenna, rank 2 codebook (option 1)

| i | k | |
|---|---|---|
| | 0 | 1 |
| 0-15 | $W_{i,i+4,0}^{(2)}$ | $W_{i+2,i+6,0}^{(2)}$ | where $W_{m,m',n}^{(1)} = \frac{1}{\sqrt{8}} \begin{bmatrix} v_m & v_{m'} \\ a_m \varphi_n v_m & -a_m \varphi_n v_{m'} \end{bmatrix}$ Co-pol antenna, rank 2 codebook (option 2)

| i | k | |
|---|---|---|
| | 0 | 1 |
| 0-15 | $W_{i,i+4,0}^{(2)}$ | $W_{i+1,i+5,0}^{(2)}$ | where $W_{m,m',n}^{(1)} = \frac{1}{\sqrt{8}} \begin{bmatrix} v_m & v_{m'} \\ a_m \varphi_n v_m & -a_m \varphi_n v_{m'} \end{bmatrix}$ $\varphi_n = e^{j\pi n/2}$ $a_l = e^{2j\frac{2\pi(l\,mod\,16)}{16}}$ $v_m = \begin{bmatrix} 1 & e^{j2\pi m/16} & e^{j4\pi m/16} & e^{j6\pi m/16} \end{bmatrix}^T$

5.2. Codebook Size ($W_1$, W7 for Rank 1, $W_2$ for Rank 2: 3, 2, 2)

$W_1$ is composed of 8 codewords and each codeword is composed of eight adjacent vectors in a 2×16 DFT matrix oversampled 8 times. $D_a(l)$ is applied to $W_1$ such that each vector of a final codeword has a linear phase increase property in a co-polarization antenna. $W_1$ shares the same codebook regardless of the co-polarization structure and the cross polarization structure. Four vectors of $\tilde{W}_1(l)$ overlap between adjacent codewords of $W_1$. Accordingly, the UE may more accurately update $W_1$ via feedback and reduce feedback overhead.

$W_2$ of the cross polarization structure is configured to have four phase compensation values $(1, -1, j, -j)$ in order to compensate for a phase difference between a vertical antenna group and a horizontal antenna group at rank 1. In the cross polarization structure, a selection value is fixed to $e_1$ such that only a phase compensation value is optimally changed in short-term or subband units. This is because 2 bits corresponding to the codebook size of $W_2$ are all used for phase compensation to obtain good performance in consideration of tradeoff between performance obtained by the selection value and performance obtained by phase compensation in the cross polarization structure as described above. Since $W_1$ is composed of 8 codewords, a final precoder is composed of one arbitrary vector of a 2×8 DFT matrix oversampled 4 times.

$W_2$ of the cross polarization structure is configured to have two phase compensation values $((1, -1), (j, -j))$ in order to compensate for a phase difference between a vertical antenna group and a horizontal antenna group at rank 2. The remaining 1 bit uses $((e_1, e_1), (e_3, e_3))$ as a selection value. Accordingly, the phase compensation value and the selection value are optimally changed in short-term or subband units. This is because 1 bit of 2 bits corresponding to the codebook size of $W_2$ is used for phase compensation and the remaining 1 bit is used as the selection value to obtain good performance in consideration of tradeoff between performance obtained by the selection value and performance obtained by phase compensation in the cross polarization structure as described above. Alternatively, in the cross polarization structure, the selection value may be composed of $((e_1, e_1), (e_2, e_2))$ and correlation between an i-th layer of a final beam selected as $((e_1, e_1)$ and an i-th layer of a final beam selected as $(e_2, e_2)$ is greater than that of the case in which the selection value is composed of $((e_1, e_1), (e_3, e_3))$. Accordingly, channel selectivity is advantageously low on a time or frequency axis.

$W_2$ of the co-polarization structure is configured to have one phase compensation value (1) in order to compensate for a phase difference between a vertical antenna group and a horizontal antenna group at rank 1. That is, a phase compensation value is not present. In the co-polarization structure, a selection value is composed of $(e_1, e_2, e_3, e_4)$ such that only the selection value is optimally changed in short-term or subband units. This is because 2 bits corresponding to the codebook size of $W_2$ are all used as the selection value to obtain good performance in consideration of tradeoff between performance obtained by the selection value and performance obtained by phase compensation in the co-polarization structure as described above. Since $W_1$ is composed of 8 codewords, a final precoder is composed of one arbitrary vector of a 2×8 DFT matrix oversampled 4 times.

$W_2$ of the co-polarization structure is configured to have one phase compensation value in order to compensate for a phase difference between a vertical antenna group and a horizontal antenna group at rank 2. That is, a phase compensation value is not present. In the co-polarization structure, a selection value is composed of $(e_1, e_5)$ $(e_3, e_7)$, $(e_2, e_6)$, $(e_4, e_8))$ such that only the selection value is optimally changed in short-term or subband units. This is because 2 bits corresponding to the codebook size of $W_2$ are all used as the selection value to obtain good performance in consideration of tradeoff between performance obtained by the selection value and performance obtained by phase compensation in the co-polarization structure as described above. As the beam vectors of a first layer and a second layer are composed of vectors separated by an interval of 4 among vectors configuring $\tilde{W}_1(l)$, both beam vectors of the first layer and the second layer have the linear phase increase property when combined with $D_a(l)$.

Next, a codebook according to 5.2 will be described.

---

5.2 Codebook size ($W_1$, $W_2$ for rank 1, $W_2$ for rank 2: 3,2,2)

$$W_1(l) = \begin{bmatrix} \tilde{W}_1(l) & 0 \\ 0 & \tilde{W}_1(l)D_a(l) \end{bmatrix}, l\in\{0, 1, 2, \ldots, 7\}$$

where $\tilde{W}_1(l)$ and the element of $D_a(l)$ at p-th row and q-th column are defined as (p and q start from zero)

$$\tilde{W}_1(l) = [w_{(2l)mod16} \quad w_{(2l+1)mod16} \quad \cdots \quad w_{(2l+6)mod16} \quad w_{(2l+7)mod16}],$$

$$w_n = \begin{bmatrix} 1 \\ e^{j\frac{2\pi n}{16}} \end{bmatrix}$$

$$\{D_a(l)\}_{pq} = \begin{cases} e^{2\cdot j\frac{2\pi\cdot((2l+(p\,mod\,4))mod16)}{16}}, & p = q \\ 0, & p \neq q. \end{cases}$$

$W_2$ can be represented for rank 1 as $$W_2(m) = \begin{bmatrix} e_1 \\ e^{j\frac{\pi m}{2}}e_1 \end{bmatrix},$$

$m\in\{0, 1, 2, 3\}$ (for X-pol antenna configuration)

$$W_2(m) = \begin{bmatrix} e_m \\ e_m \end{bmatrix}, m\in\{1, 2, 3, 4\} \text{(for Co-pol antenna configuration)}$$

$W_2$ can be represented for rank 2 as $$W_2(m, n_1, n_2) = \begin{bmatrix} e_{n_1} & e_{n_2} \\ e^{j\frac{\pi m}{2}}e_{n_1} & -e^{j\frac{\pi m}{2}}e_{n_2} \end{bmatrix},$$

$m\in\{0, 1\}, (n_1, n_2)\in\{(1, 1), (3, 3)\}$ or $$W_2(m, n_1, n_2) = \begin{bmatrix} e_{n_1} & e_{n_2} \\ e^{j\frac{\pi m}{2}}e_{n_1} & -e^{j\frac{\pi m}{2}}e_{n_2} \end{bmatrix},$$

$m\in\{0, 1\}, (n_1, n_2)\in\{(1, 1), (2, 2)\}$.

(for X-pol antenna configuration)

$$W_2(n_1, n_2) = \begin{bmatrix} e_{n_1} & e_{n_2} \\ e_{n_1} & -e_{n_2} \end{bmatrix}, (n_1, n_2)\in\{(1, 5), (2, 6), (3, 7), (4, 8)\}.$$

(for Co-pol antenna configuration)

X pol antenna, rank 1 codebook

| | k | | | |
|---|---|---|---|---|
| i | 0 | 1 | 2 | 3 |
| 0-7 | $W_{2i,0}^{(1)}$ | $W_{2i,1}^{(1)}$ | $W_{2i,2}^{(1)}$ | $W_{2i,3}^{(1)}$ |

-continued 5.2 Codebook size ($W_1$, $W_2$ for rank 1, $W_2$ for rank 2: 3,2,2)

where $W_{m,n}^{(1)} = \frac{1}{\sqrt{4}}\begin{bmatrix} v_m \\ a_m\varphi_n v_m \end{bmatrix}$ X pol antenna, rank 2 codebook (option 1)

| i | k=0 | k=1 | k=2 | k=3 |
|---|---|---|---|---|
| 0-7 | $W_{2i,2i,0}^{(2)}$ | $W_{2i,2i,1}^{(2)}$ | $W_{2i+2,2i+2,0}^{(2)}$ | $W_{2i+2,2i+2,1}^{(2)}$ | where $W_{m,m',n}^{(1)} = \frac{1}{\sqrt{8}}\begin{bmatrix} v_m & v_{m'} \\ a_m\varphi_n v_m & -a_m\varphi_n v_{m'} \end{bmatrix}$ pol antenna, rank 2 codebook (option 2)

| i | k=0 | k=1 | k=2 | k=3 |
|---|---|---|---|---|
| 0-7 | $W_{2i,2i,0}^{(2)}$ | $W_{2i,2i,1}^{(2)}$ | $W_{2i+1,2i+1,0}^{(2)}$ | $W_{2i+1,2i+1,1}^{(2)}$ | where $W_{m,m',n}^{(1)} = \frac{1}{\sqrt{8}}\begin{bmatrix} v_m & v_{m'} \\ a_m\varphi_n v_m & -a_m\varphi_n v_{m'} \end{bmatrix}$ Co-pol antenna, rank 1 codebook

| i | k=0 | k=1 | k=2 | k=3 |
|---|---|---|---|---|
| 0-7 | $W_{2i,0}^{(1)}$ | $W_{2i+1,0}^{(1)}$ | $W_{2i+2,0}^{(1)}$ | $W_{2i+3,0}^{(1)}$ | where $W_{m,n}^{(1)} = \frac{1}{\sqrt{4}}\begin{bmatrix} v_m \\ a_m\varphi_n v_m \end{bmatrix}$ Co-pol antenna, rank 2 codebook

| i | k=0 | k=1 | k=2 | k=3 |
|---|---|---|---|---|
| 0-7 | $W_{2i,2i+4,0}^{(2)}$ | $W_{2i+1,2i+5,0}^{(2)}$ | $W_{2i+2,2i+6,0}^{(2)}$ | $W_{2i+3,2i+7,0}^{(2)}$ | where $W_{m,m',n}^{(1)} = \frac{1}{\sqrt{8}}\begin{bmatrix} v_m & v_{m'} \\ a_m\varphi_n v_m & -a_m\varphi_n v_{m'} \end{bmatrix}$ $\varphi_n = e^{j\pi n/2}$ $a_l = e^{2j\frac{2\pi(l \bmod 16)}{16}}$ $v_m = [1 \quad e^{j2\pi m/16} \quad e^{j4\pi m/16} \quad e^{j6\pi m/16}]^T$ 5.3 Codebook Size ($W_1$, $W_2$ for Rank 1, $W_2$ for Rank2: 3, 2, 1)

$W_1$ is composed of 8 codewords and each codeword is composed of eight adjacent vectors in a 2×16 DFT matrix oversampled 8 times. $D_a(l)$ is applied to $W_1$ such that each vector of a final codeword has a linear phase increase property in a co-polarization antenna. $W_1$ shares the same codebook regardless of the co-polarization structure and the cross polarization structure. Four vectors of $\tilde{W}_1(l)$ overlap between adjacent codewords of $W_1$. Accordingly, the UE may more accurately update $W_1$ via feedback and reduce feedback overhead.

$W_2$ of the cross polarization structure is configured to have four phase compensation values (1, −1, j, −j) in order to compensate for a phase difference between a vertical antenna group and a horizontal antenna group at rank 1. In the cross polarization structure, a selection value is fixed to $e_1$ such that only a phase compensation value is optimally changed in short-term or subband units. This is because 2 bits corresponding to the codebook size of $W_2$ are all used for phase compensation to obtain good performance in consideration of tradeoff between performance obtained by the selection value and performance obtained by phase compensation in the cross polarization structure as described above. Since $W_1$ is composed of 8 codewords, a final precoder is composed of one arbitrary vector of a 2×8 DFT matrix oversampled 4 times.

$W_2$ of the cross polarization structure is configured to have two phase compensation values ((1, −1), (j, −j)) in order to compensate for a phase difference between a vertical antenna group and a horizontal antenna group at rank 2. In the cross polarization structure, a selection value is fixed to ($e_1$, $e_1$) such that only a phase compensation value is optimally changed in short-term or subband units. This is because 1 bit corresponding to the codebook size of $W_2$ is used for phase compensation to obtain good performance in consideration of tradeoff between performance obtained by the selection value and performance obtained by phase compensation in the cross polarization structure as described above.

$W_2$ of the co-polarization structure is configured to have one phase compensation value (1) in order to compensate for a phase difference between a vertical antenna group and a horizontal antenna group at rank 1. That is, a phase compensation value is not present. In the co-polarization structure, a selection value is composed of ($e_1$, $e_2$, $e_3$, $e_4$) such that only the selection value is changed in short-term or subband units. This is because 2 bits corresponding to the codebook size of $W_2$ are all used as the selection value to obtain good performance in consideration of tradeoff between performance obtained by the selection value and performance obtained by phase compensation in the cross polarization structure as described above. Since $W_1$ is composed of 8 codewords, a final precoder is composed of one arbitrary vector of a 2×8 DFT matrix oversampled 4 times.

$W_2$ of the co-polarization structure is configured to have one phase compensation value ((1, −1)) in order to compensate for a phase difference between a vertical antenna group and a horizontal antenna group at rank 2. That is, a phase compensation value is not present. In the co-polarization structure, a selection value is composed of (($e_1$, $e_5$), ($e_3$, $e_7$)) such that only the selection value is changed in short-term or subband units. This is because 1 bit corresponding to the codebook size of $W_2$ is used as the selection value to obtain good performance in consideration of tradeoff between performance obtained by the selection value and performance obtained by phase compensation in the co-polarization structure as described above. As the beam vectors of a first layer and a second layer are composed of vectors separated by an interval of 4 among vectors configuring $\tilde{W}_1(l)$, both the beam vectors of the first layer and the second layer have the linear phase increase property when combined with $D_a(l)$. Alternatively, in the co-polarization structure, the selection value may be composed of (($e_1$, $e_5$), ($e_2$, $e_6$)) and correlation between an i-th layer of a final beam selected as (($e_1$, $e_5$) and an i-th layer of a final beam selected as ($e_2$, $e_6$) is greater than that of the case in which the selection value is composed of (($e_1$, $e_5$), ($e_3$, $e_7$)). Accordingly, channel selectivity is advantageously low on a time or frequency axis.

Next, a codebook according to 5.3 will be described.

5.3 Codebook size ($W_1$, $W_2$ for rank 1, $W_2$ for rank 2: 3,2,1)

$$W_1(l) = \begin{bmatrix} \tilde{W}_1(l) & 0 \\ 0 & \tilde{W}_1(l)D_a(l) \end{bmatrix}, \; l \in \{0, 1, 2, \ldots, 7\}$$

where $\tilde{W}_1(l)$ and the element of $D_a(l)$ at $p$-th row and $q$-th column are defined as ($p$ and $q$ start from zero)

$$\tilde{W}_1(l) = [\, w_{(2l)\bmod 16} \; w_{(2l+1)\bmod 16} \; \cdots \; w_{(2l+6)\bmod 16} \; w_{(2l+7)\bmod 16} \,],$$

$$w_n = \begin{bmatrix} 1 \\ e^{j\frac{2\pi n}{16}} \end{bmatrix}$$

$$\{D_a(l)\}_{pq} = \begin{cases} e^{2 \cdot j \frac{2\pi \cdot ((2l+(p \bmod 4)) \bmod 16)}{16}}, & p = q \\ 0, & p \neq q. \end{cases}$$

$W_2$ can be represented for rank 1 as $$W_2(m) = \begin{bmatrix} e_1 \\ e^{j\frac{\pi m}{2}} e_1 \end{bmatrix}, \; m \in \{0, 1, 2, 3\} \text{ (for X-pol antenna configuration)}$$

$$W_2(m) = \begin{bmatrix} e_m \\ e_m \end{bmatrix}, \; m \in \{1, 2, 3, 4\} \text{ (for Co-pol antenna configuration)}$$

$W_2$ can be represented for rank 2 as $$W_2(m) = \begin{bmatrix} e_1 & e_1 \\ e^{j\frac{\pi m}{2}} e_1 & -e^{j\frac{\pi m}{2}} e_1 \end{bmatrix}, \; m \in \{0, 1\}.$$

(for X-pol antenna configuration)

$$W_2(n_1, n_2) = \begin{bmatrix} e_{n_1} & e_{n_2} \\ e_{n_1} & -e_{n_2} \end{bmatrix}, \; (n_1, n_2) \in \{(1, 5), (3, 7)\} \text{ or}$$

$$W_2(n_1, n_2) = \begin{bmatrix} e_{n_1} & e_{n_2} \\ e_{n_1} & -e_{n_2} \end{bmatrix}, \; (n_1, n_2) \in \{(1, 5), (2, 6)\}.$$

(for Co-pol antenna configuration)

X pol antenna, rank 1 codebook

| | k | | | |
|---|---|---|---|---|
| i | 0 | 1 | 2 | 3 |
| 0-7 | $W_{2i,0}^{(1)}$ | $W_{2i,1}^{(1)}$ | $W_{2i,2}^{(1)}$ | $W_{2i,3}^{(1)}$ | where $W_{m,n}^{(1)} = \dfrac{1}{\sqrt{4}} \begin{bmatrix} v_m \\ a_m \varphi_n v_m \end{bmatrix}$

X pol antenna, rank 2 codebook

| | k | |
|---|---|---|
| i | 0 | 1 |
| 0-7 | $W_{2i,2i,0}^{(2)}$ | $W_{2i,2i,1}^{(2)}$ | where $W_{m,m',n}^{(1)} = \dfrac{1}{\sqrt{8}} \begin{bmatrix} v_m & v_{m'} \\ a_m \varphi_n v_m & -a_m \varphi_n v_{m'} \end{bmatrix}$

Co-pol antenna, rank 1 codebook

| | k | | | |
|---|---|---|---|---|
| i | 0 | 1 | 2 | 3 |
| 0-7 | $W_{2i,0}^{(1)}$ | $W_{2i+1,0}^{(1)}$ | $W_{2i+2,0}^{(1)}$ | $W_{2i+3,0}^{(1)}$ | where $W_{m,n}^{(1)} = \dfrac{1}{\sqrt{4}} \begin{bmatrix} v_m \\ a_m \varphi_n v_m \end{bmatrix}$

Co-pol antenna, rank 2 codebook (option 1)

| | k | |
|---|---|---|
| i | 0 | 1 |
| 0-7 | $W_{2i,2i+4,0}^{(2)}$ | $W_{2i+2,2i+6,0}^{(2)}$ | where $W_{m,m',n}^{(1)} = \dfrac{1}{\sqrt{8}} \begin{bmatrix} v_m & v_{m'} \\ a_m \varphi_n v_m & -a_m \varphi_n v_{m'} \end{bmatrix}$

Co-pol antenna, rank 2 codebook (option 2)

| | k | |
|---|---|---|
| i | 0 | 1 |
| 0-7 | $W_{2i,2i+4,0}^{(2)}$ | $W_{2i+1,2i+5,0}^{(2)}$ | where $W_{m,m',n}^{(1)} = \dfrac{1}{\sqrt{8}} \begin{bmatrix} v_m & v_{m'} \\ a_m \varphi_n v_m & -a_m \varphi_n v_{m'} \end{bmatrix}$ $$\varphi_n = e^{j\pi n/2}$$

$$a_l = e^{2j\frac{2\pi(l \bmod 16)}{16}}$$

$$v_m = \begin{bmatrix} 1 & e^{j2\pi m/16} & e^{j4\pi m/16} & e^{j6\pi m/16} \end{bmatrix}^T$$

5.4 Codebook Size ($W_1$, $W_2$ for Rank1, $W_2$ for Rank2: 4, 2, 2)

$W_1$ is composed of 16 codewords and each codeword is composed of eight adjacent vectors in a 2×16 DFT matrix oversampled 8 times. $D_a(l)$ is applied to $W_1$ such that each vector of a final codeword has a linear phase increase property in a co-polarization antenna. $W_1$ shares the same codebook regardless of the co-polarization structure and the cross polarization structure. Seven vectors of $\tilde{W}_1(l)$ overlap between adjacent codewords of $W_1$. Accordingly, the UE may more accurately update $W_1$ via feedback.

$W_2$ of the cross polarization structure is configured to have four phase compensation values (1, −1, j, −j) in order to compensate for a phase difference between a vertical antenna group and a horizontal antenna group at rank 1. In the cross polarization structure, a selection value is fixed to $e_1$ such that only a phase compensation value is changed in short-term or subband units. This is because 2 bits corresponding to the codebook size of $W_2$ are all used for phase compensation to obtain good performance in consideration of tradeoff between performance obtained by the selection value and performance obtained by phase compensation in the cross polarization structure as described above. Since $W_1$ is composed of 16 codewords, a final precoder is composed of one arbitrary vector of a 2×16 DFT matrix oversampled 8 times.

$W_2$ of the cross polarization structure is configured to have two phase compensation values ((1, −1), (j, −j)) in order to compensate for a phase difference between a vertical antenna group and a horizontal antenna group at rank 2. The remaining 1 bit uses (($e_1$, $e_1$), ($e_3$, $e_3$)) as a selection value. Accordingly, the phase compensation value and the selection value are optimally changed in short-term or subband units. This is because 1 bit of 2 bits corresponding to the codebook size of $W_2$ is used for phase compensation and the remaining 1 bit is used as the selection value to obtain good performance in consideration of tradeoff between performance obtained by the selection value and performance obtained by phase compensation in the cross polarization structure as described above. Alternatively, in the cross polarization structure, the selection value may be composed of $((e_1, e_1), (e_2, e_2))$ and correlation between an i-th layer of a final beam selected as $((e_1, e_1)$ and an i-th layer of a final beam selected as $(e_2, e_2)$ is greater than that of the case in which the selection value is composed of $((e_1, e_1), (e_3, e_3))$. Accordingly, channel selectivity is advantageously low on a time or frequency axis.

$W_2$ of the co-polarization structure is configured to have one phase compensation value (1) in order to compensate for a phase difference between a vertical antenna group and a horizontal antenna group at rank 1. That is, a phase compensation value is not present. In the co-polarization structure, a selection value is composed of $(e_1, e_2, e_3, e_4)$ such that only the selection value is optimally changed in short-term or subband units. This is because 2 bits corresponding to the codebook size of $W_2$ are all used as the selection value to obtain good performance in consideration of tradeoff between performance obtained by the selection value and performance obtained by phase compensation in the co-polarization structure as described above.

$W_2$ of the co-polarization structure is configured to have one phase compensation value in order to compensate for a phase difference between a vertical antenna group and a horizontal antenna group at rank 2. That is, a phase compensation value is not present. In the co-polarization structure, a selection value is composed of $(e_1, e_5) (e_3, e_7), (e_2, e_6), (e_4, e_8))$ such that only the selection value is optimally changed in short-term or subband units. This is because 2 bits corresponding to the codebook size of $W_2$ are all used as the selection value to obtain good performance in consideration of tradeoff between performance obtained by the selection value and performance obtained by phase compensation in the co-polarization structure as described above. As the beam vectors of a first layer and a second layer are composed of vectors separated by an interval of 4 among vectors configuring $\tilde{W}_1(l)$, both the beam vectors of the first layer and the second layer have the linear phase increase property when combined with $D_a(l)$.

Next, a codebook according to 5.4 will be described.

---

5.4 Codebook size ($W_1$, $W_2$ for rank 1, $W_2$ for rank 2: 4,2,2)

$$W_1(l) = \begin{bmatrix} \tilde{W}_1(l) & 0 \\ 0 & \tilde{W}_1(l)D_a(l) \end{bmatrix}, l \in \{0, 1, 2, \ldots, 15\}$$

where $\tilde{W}_1(l)$ and the element of $D_a(l)$ at p-th row and q-th column are defined as (p and q start from zero)

$$\tilde{W}_1(l) = [w_{(l)mod16} \quad w_{(l+1)mod16} \quad \cdots \quad w_{(l+6)mod16} \quad w_{(l+7)mod16}],$$

$$w_n = \begin{bmatrix} 1 \\ e^{j\frac{2\pi n}{16}} \end{bmatrix}$$

$$\{D_a(l)\}_{pq} = \begin{cases} e^{2 \cdot j \frac{2\pi \cdot ((1+(pmod4))mod16)}{16}}, & p = q \\ 0, & p \neq q \end{cases}$$

$W_2$ can be represented for rank 1 as $$W_2(m) = \begin{bmatrix} e_1 \\ e^{j\frac{\pi m}{2}} e_1 \end{bmatrix}, m \in \{0, 1, 2, 3\} \text{(for X-pol antenna configuration)}$$

---

-continued 5.4 Codebook size ($W_1$, $W_2$ for rank 1, $W_2$ for rank 2: 4,2,2)

$$W_2(m) = \begin{bmatrix} e_m \\ e_m \end{bmatrix}, m \in \{1, 2, 3, 4\} \text{(for Co-pol antenna configuration)}$$

$W_2$ can be represented for rank 2 as $$W_2(m, n_1, n_2) = \begin{bmatrix} e_{n_1} & e_{n_2} \\ e^{j\frac{\pi m}{2}} e_{n_1} & -e^{j\frac{\pi m}{2}} e_{n_2} \end{bmatrix},$$

$m \in \{0, 1\}, (n_1, n_2) \in \{(1, 1), (3, 3)\}$ or $$W_2(m, n_1, n_2) = \begin{bmatrix} e_{n_1} & e_{n_2} \\ e^{j\frac{\pi m}{2}} e_{n_1} & -e^{j\frac{\pi m}{2}} e_{n_2} \end{bmatrix},$$

$m \in \{0, 1\}, (n_1, n_2) \in \{(1, 1), (2, 2)\}$.

(for X-pol antenna configuration)

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (2, 6), (3, 7), (4, 8)\}.$$

(for Co-pol antenna configuration)

X pol antenna, rank 1 codebook

| | k | | | |
|---|---|---|---|---|
| i | 0 | 1 | 2 | 3 |
| 0-15 | $W_{i,0}^{(1)}$ | $W_{i,1}^{(1)}$ | $W_{i,2}^{(1)}$ | $W_{i,3}^{(1)}$ | where $W_{m,n}^{(1)} = \frac{1}{\sqrt{4}} \begin{bmatrix} v_m \\ a_m \varphi_n v_m \end{bmatrix}$ X pol antenna, rank 2 codebook (option 1)

| | k | | | |
|---|---|---|---|---|
| i | 0 | 1 | 2 | 3 |
| 0-15 | $W_{i,i,0}^{(2)}$ | $W_{i,i,1}^{(2)}$ | $W_{i+2,i+2,0}^{(2)}$ | $W_{i+2,i+2,1}^{(2)}$ | where $W_{m,m',n}^{(1)} = \frac{1}{\sqrt{8}} \begin{bmatrix} v_m & v_{m'} \\ a_m \varphi_n v_m & -a_m \varphi_n v_{m'} \end{bmatrix}$ X pol antenna, rank 2 codebook (option 2)

| | k | | | |
|---|---|---|---|---|
| i | 0 | 1 | 2 | 3 |
| 0-15 | $W_{i,i,0}^{(2)}$ | $W_{i,i,1}^{(2)}$ | $W_{i+1,i+1,0}^{(2)}$ | $W_{i+1,i+1,1}^{(2)}$ | where $W_{m,m',n}^{(1)} = \frac{1}{\sqrt{8}} \begin{bmatrix} v_m & v_{m'} \\ a_m \varphi_n v_m & -a_m \varphi_n v_{m'} \end{bmatrix}$ Co-pol antenna, rank 1 codebook

| | k | | | |
|---|---|---|---|---|
| i | 0 | 1 | 2 | 3 |
| 0-15 | $W_{i,0}^{(1)}$ | $W_{i+1,0}^{(1)}$ | $W_{i+2,0}^{(1)}$ | $W_{i+3,0}^{(1)}$ | where $W_{m,n}^{(1)} = \frac{1}{\sqrt{4}} \begin{bmatrix} v_m \\ a_m \varphi_n v_m \end{bmatrix}$ 5.4 Codebook size ($W_1$, $W_2$ for rank 1, $W_2$ for rank 2: 4,2,2)

Co-pol antenna, rank 2 codebook

| i | k=0 | k=1 | k=2 | k=3 |
|---|---|---|---|---|
| 0-15 | $W^{(2)}_{i,i+4,0}$ | $W^{(2)}_{i+1,i+5,0}$ | $W^{(2)}_{i+2,i+6,0}$ | $W^{(2)}_{i+3,i+7,0}$ | where $W^{(1)}_{m,m',n} = \frac{1}{\sqrt{8}} \begin{bmatrix} v_m & v_{m'} \\ a_m \varphi_n v_m & -a_m \varphi_n v_{m'} \end{bmatrix}$ $\varphi_n = e^{j\pi n/2}$ $a_l = e^{2j \frac{2\pi(l \bmod 16)}{16}}$ $v_m = \begin{bmatrix} 1 & e^{j2\pi m/16} & e^{j4\pi m/16} & e^{j6\pi m/16} \end{bmatrix}^T$ 5.5 Codebook Size ($W_1$, $W_2$ for Rank1, $W_2$ for Rank2: 2, 2, 2)

$W_1$ is composed of 4 codewords and each codeword is composed of eight adjacent vectors in a 2×16 DFT matrix oversampled 8 times. $D_a(l)$ is applied to $W_1$ such that each vector of a final codeword has a linear phase increase property in a co-polarization antenna. $W_1$ shares the same codebook regardless of the co-polarization structure and the cross polarization structure. Four vectors of $\tilde{W}_1(l)$ overlap between adjacent codewords of $W_1$. Accordingly, the UE may less accurately update $W_1$ via feedback as compared to 5.1 to 5.4 but reduce feedback overhead.

$W_2$ of the cross polarization structure is configured to have four phase compensation values (1, −1, j, −j) in order to compensate for a phase difference between a vertical antenna group and a horizontal antenna group at rank 1. In the cross polarization structure, a selection value is fixed to e+ such that only a phase compensation value is optimally changed in short-term or subband units. This is because 2 bits corresponding to the codebook size of $W_2$ are all used for phase compensation to obtain good performance in consideration of tradeoff between performance obtained by the selection value and performance obtained by phase compensation in the cross polarization structure as described above. Since $W_1$ is composed of 4 codewords, a final precoder is composed of one arbitrary vector of a 2×4 DFT matrix oversampled 4 times.

$W_2$ of the cross polarization structure is configured to have two phase compensation values ((1, −1), (j, −j)) in order to compensate for a phase difference between a vertical antenna group and a horizontal antenna group at rank 2. The remaining 1 bit uses (($e_1$, $e_1$), ($e_3$, $e_3$)) as a selection value. Accordingly, the phase compensation value and the selection value are optimally changed in short-term or subband units. This is because 1 bit of 2 bits corresponding to the codebook size of $W_2$ is used for phase compensation and the remaining 1 bit is used as the selection value to obtain good performance in consideration of tradeoff between performance obtained by the selection value and performance obtained by phase compensation in the cross polarization structure as described above. Alternatively, in the cross polarization structure, the selection value may be composed of (($e_1$, $e_1$), ($e_2$, $e_2$)) and correlation between an i-th layer of a final beam selected as (($e_1$, $e_1$) and an i-th layer of a final beam selected as ($e_2$, $e_2$) is greater than that of the case in which the selection value is composed of (($e_1$, $e_1$), ($e_3$, $e_3$)). Accordingly, channel selectivity is advantageously low on a time or frequency axis.

$W_2$ of the co-polarization structure is configured to have one phase compensation value (1) in order to compensate for a phase difference between a vertical antenna group and a horizontal antenna group at rank 1. That is, a phase compensation value is not present. In the co-polarization structure, a selection value is composed of ($e_1$, $e_2$, $e_3$, $e_4$) such that only the selection value is optimally changed in short-term or subband units. This is because 2 bits corresponding to the codebook size of $W_2$ are all used as the selection value to obtain good performance in consideration of tradeoff between performance obtained by the selection value and performance obtained by phase compensation in the co-polarization structure as described above.

$W_2$ of the co-polarization structure is configured to have one phase compensation value in order to compensate for a phase difference between a vertical antenna group and a horizontal antenna group at rank 2. That is, a phase compensation value is not present. In the co-polarization structure, a selection value is composed of (($e_1$, $e_5$) ($e_3$, $e_7$), ($e_2$, $e_6$), ($e_4$, $e_8$)) such that only the selection value is optimally changed in short-term or subband units. This is because 2 bits corresponding to the codebook size of $W_2$ are all used as the selection value to obtain good performance in consideration of tradeoff between performance obtained by the selection value and performance obtained by phase compensation in the co-polarization structure as described above. As the beam vectors of a first layer and a second layer are composed of vectors separated by an interval of 4 among vectors configuring $\tilde{W}_1(l)$, both the beam vectors of the first layer and the second layer have the linear phase increase property when combined with $D_a(l)$.

Next, a codebook according to 5.5 will be described.

5.5 Codebook size ($W_1$, $W_2$ for rank 1, $W_2$ for rank 2: 2,2,2)

$W_1(l) = \begin{bmatrix} \tilde{W}_1(l) & 0 \\ 0 & \tilde{W}_1(l) D_a(l) \end{bmatrix}$, $l \in \{0, 1, 2, 3\}$ where $\tilde{W}_1(l)$ and the element of $D_a(l)$ at p-th row and q-th column are defined as (p and q start from zero)

$\tilde{W}_1(l) = \begin{bmatrix} w_{(4l)\bmod 16} & w_{(4l+1)\bmod 16} & \cdots & w_{(4l+6)\bmod 16} & w_{(4l+7)\bmod 16} \end{bmatrix}$, $w_n = \begin{bmatrix} 1 \\ e^{j\frac{2\pi n}{16}} \end{bmatrix}$ $\{D_a(l)\}_{pq} = \begin{cases} e^{2 \cdot j \frac{2\pi \cdot ((4l+(p \bmod 4))\bmod 16)}{16}}, & p = q \\ 0, & p \neq q \end{cases}$ $W_2$ can be represented for rank 1 as $W_2(m) = \begin{bmatrix} e_1 \\ e^{j\frac{\pi m}{2}} e_1 \end{bmatrix}$, $m \in \{0, 1, 2, 3\}$ (for X-pol antenna configuration)

$W_2(m) = \begin{bmatrix} e_m \\ e_m \end{bmatrix}$, $m \in \{1, 2, 3, 4\}$ (for Co-pol antenna configuration)

$W_2$ can be represented for rank 2 as $W_2(m, n_1, n_2) = \begin{bmatrix} e_{n_1} & e_{n_2} \\ e^{j\frac{\pi m}{2}} e_{n_1} & -e^{j\frac{\pi m}{2}} e_{n_2} \end{bmatrix}$, $m \in \{0, 1\}$, $(n_1, n_2) \in \{(1, 1), (3, 3)\}$ or -continued 5.5 Codebook size ($W_1$, $W_2$ for rank 1, $W_2$ for rank 2: 2,2,2)

$$W_2(m, n_1, n_2) = \begin{bmatrix} e_{n_1} & e_{n_2} \\ e^{j\frac{\pi m}{2}}e_{n_1} & -e^{j\frac{\pi m}{2}}e_{n_2} \end{bmatrix},$$

$m \in \{0, 1\}, (n_1, n_2) \in \{(1, 1), (2, 2)\}.$ (for X-pol antenna configuration)

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (2, 6), (3, 7), (4, 8)\}.$$

(for Co-pol antenna configuration)

X pol antenna, rank 1 codebook

| | | | k | | |
|---|---|---|---|---|---|
| i | 0 | 1 | 2 | 3 |
| 0-3 | $W_{4i,0}^{(1)}$ | $W_{4i,1}^{(1)}$ | $W_{4i,2}^{(1)}$ | $W_{4i,3}^{(1)}$ | where $W_{m,n}^{(1)} = \frac{1}{\sqrt{4}}\begin{bmatrix} v_m \\ a_m\varphi_n v_m \end{bmatrix}$ X pol antenna, rank 2 codebook (option 1)

| | | | k | | |
|---|---|---|---|---|---|
| i | 0 | 1 | 2 | 3 |
| 0-3 | $W_{4i,4i,0}^{(2)}$ | $W_{4i,4i,1}^{(2)}$ | $W_{4i+2,4i+2,0}^{(2)}$ | $W_{4i+2,4i+2,1}^{(2)}$ | where $W_{m,m',n}^{(1)} = \frac{1}{\sqrt{8}}\begin{bmatrix} v_m & v_{m'} \\ a_m\varphi_n v_m & -a_m\varphi_n v_{m'} \end{bmatrix}$ X pol antenna, rank 2 codebook (option 2)

| | | | k | | |
|---|---|---|---|---|---|
| i | 0 | 1 | 2 | 3 |
| 0-3 | $W_{4i,4i,0}^{(2)}$ | $W_{4i,4i,1}^{(2)}$ | $W_{4i+1,4i+1,0}^{(2)}$ | $W_{4i+1,4i+1,1}^{(2)}$ | where $W_{m,m',n}^{(1)} = \frac{1}{\sqrt{8}}\begin{bmatrix} v_m & v_{m'} \\ a_m\varphi_n v_m & -a_m\varphi_n v_{m'} \end{bmatrix}$ Co-pol antenna, rank 1 codebook

| | | | k | | |
|---|---|---|---|---|---|
| i | 0 | 1 | 2 | 3 |
| 0-3 | $W_{4i,0}^{(1)}$ | $W_{4i+1,0}^{(1)}$ | $W_{4i+2,0}^{(1)}$ | $W_{4i+3,0}^{(1)}$ | where $W_{m,n}^{(1)} = \frac{1}{\sqrt{4}}\begin{bmatrix} v_m \\ a_m\varphi_n v_m \end{bmatrix}$ Co-pol antenna, rank 2 codebook

| | | | k | | |
|---|---|---|---|---|---|
| i | 0 | 1 | 2 | 3 |
| 0-3 | $W_{4i,4i+4,0}^{(2)}$ | $W_{4i+1,4i+5,0}^{(2)}$ | $W_{4i+2,4i+6,0}^{(2)}$ | $W_{4i+3,4i+7,0}^{(2)}$ | where $W_{m,m',n}^{(1)} = \frac{1}{\sqrt{8}}\begin{bmatrix} v_m & v_{m'} \\ a_m\varphi_n v_m & -a_m\varphi_n v_{m'} \end{bmatrix}$ -continued 5.5 Codebook size ($W_1$, $W_2$ for rank 1, $W_2$ for rank 2: 2,2,2)

$\varphi_n = e^{j\pi n/2}$ $a_1 = e^{2j\frac{2\pi(l \bmod 16)}{16}}$ $v_m = \begin{bmatrix} 1 & e^{j2\pi m/16} & e^{j4\pi m/16} & e^{j6\pi m/16} \end{bmatrix}^T$ Sixth Embodiment Codebook Restriction Method for Feedback A method of, at a BS, previously signaling the number of feedback bits to a UE independent of the number of bits indicating the size of a codebook and, at the UE, associating selected codewords determined by an instruction of the BS or as a default with states represented by the feedback bits to perform feedback in a feedback process for a single or a plurality of codebooks when the single or the plurality of codebooks are present according to another embodiment of the present invention will be described.

In a 3GPP LTE-A system, a method of introducing a new codebook has been discussed in order to further improve performance of a MIMO scheme. In a process of designing the codebook, a larger number of codewords needs to be ensured by applying a wider variety of channel environments and antenna structures, in order to improve performance of the codebook and to prevent inefficiency such as design of an additional codebook according to change in channel environment. However, if feedback on a codebook containing a larger number of codewords is performed, feedback overhead may be unnecessarily increased as compared to performance improvement gain. If the codebook is designed to support the co-polarization antenna structure and the cross polarization antenna structure and the actual antenna structure of a BS is a co-polarization antenna structure, codewords optimized for the co-polarization antenna structure among the codewords of the codebook may not be useful and may cause feedback errors if the wrong codewords are selected. In one embodiment of the present invention, in order to solve the above problem, a method of, at a BS, previously signaling the number of feedback bits to a UE independent of the number of bits indicating the size of a codebook and, at the UE, associating selected codewords determined according to a higher layer signal of the BS or as a default with states represented by the feedback bits to perform feedback will be described.

In another embodiment of the present invention, a method of assigning priority according to the order of codewords as a default operation will be proposed. Assume that a UE performs feedback with respect to a codebook represented by N bits and the number of feedback bits is set to M (<N). At this time, if the UE does not receive, from the BS, a separate instruction about how $2^M$ codewords corresponding to the number of feedback bits are selected, the UE may assign priority to the default state according to the order of codewords and sequentially select $2^M$ codewords, in order to perform the feedback operation. For example, feedback on a selected codeword set represented by $\{c\_1, c\_2, c\_2^M\}$ may be performed by determining that priority is given to the codebook $C=\{c\_1, c\_2, \ldots, c\_2^N\}$ represented by N bits according to the order of codewords.

A method of dividing codewords of a codebook into a plurality of groups and assigning priority to the groups when the codewords to be fed back are selected via an instruction of a BS according to another embodiment of the present invention will be described. Assume that codewords of a specific codebook are composed of P groups, that is, a group 1, a group 2, ... and a group P when codewords optimized for a channel environment configure one group. Assume that an intersection between groups is not present and a union of all groups is equal to all codeword sets of the codebook. At this time, when some codewords are selected (sub-sampling) according to operation proposed by the present invention, the codeword may be selected based on a channel environment and priority may be given in group units. Accordingly, in the present invention, when the BE enables the UE to select codewords, a method of pre-fixing the information about groups in a codebook in offline situations or pre-signaling the information about groups in the codebook via a higher layer signal such as RRC and signaling priority information of each group via a higher layer signal using a semi-static method according to change in channel environment is proposed. At this time, the UE may configure a codeword set to be fed back based on the priority information. That is, the codeword set to be fed back is configured by including codewords of a group having highest priority and then including codewords of a group having higher priority. At this time, if all codewords of a specific group may not be included due to restriction in the number of feedback bits, codewords may be sequentially selected according to default priority information of the codewords of the group. For example, assume that the number of feedback bits is M, codewords in a codebook represented by a total of N (>M) bits are partitioned into codeword sets A, B and C and a BS assigns priority to the UE in order of B, C and A. At this time, if the numbers of codewords for A, B and C are respectively n_A, n_B and n_C and a total number of codewords satisfies an inequation $n\_B+n\_C<2^M<n\_A+n\_B+n\_C=2^N$, the UE first selects n_B codewords for the group B, selects n_C codewords for the group C and selects ($2^M$−n_B−n_C) codewords from among the codewords of the group A in descending order of priority, when selecting 2M codewords to be fed back. In the case in which the operation of the present invention is performed, when more multi-codebooks are introduced after Rel-12, overhead may be reduced as compared to the case in which the BS informs the UE of priority information of each codeword, and codewords suitable for channel information may be selected.

Seventh Embodiment

Codebook Signaling Method Used when Two or More Codebooks are Supported

A method of including information about which codebook is used in configuration information of CSI-RS resources when two or more codebooks are supported according to another embodiment of the present invention will be described. In an LTE Rel-12 system according to one embodiment of the present invention, introduction of a new Rel-12 codebook in addition to a legacy Rel-8 codebook in case of four transmit antennas in an LTE Rel-12 system according to one embodiment of the present invention has been discussed. At this time, if the legacy Rel-8 codebook and the Rel-12 codebook coexist, the UE should be informed as to which codebook is fed back. Which codebook is fed back may be changed according to individual CSI-RS resources. For example, if the Rel-8 BS transmits $CSI-RS_1$, a Rel-8 codebook should be fed back and, if the Rel-12 BS transmits $CSI-RS_2$, one of a Rel-8 codebook or a Rel-12 codebook should be selected and fed back according to channel environment. Accordingly, in the present invention, a method of indicating which codebook is fed back according to CSI-RS via a higher layer signal such as RRC when a BS supports a plurality of codebooks is proposed.

A method of changing a codebook to be fed back according to version information in a configuration of a CSI-RS or CSI process when a BS supports two or more codebooks according to another embodiment of the present invention will be described. In general, version information is included in configuration information of a CSI-RS or CSI process and thus how a specific CSI-RS is interpreted may be determined according to the version information. In the present invention, a method of selecting a codebook to be fed back via version information of configuration information of a specific CSI-RS or CSI process without indicating a codebook to be fed back via a separate RRC signal is proposed. For example, the UE performs feedback using a Rel-12 4tx codebook as a codebook to be fed back for 4 transmit antennas if a version of configuration information for configuring a CSI-RS or CSI process is before Rel-10 and performs feedback using a Rel-12 4tx codebook as a codebook to be fed back if the version is Rel-12 or thereafter.

A method of changing a codebook to be fed back according to version information of a higher layer signal for a codebook subset restriction when a BS supports two or more codebook according to one embodiment of the present invention will be described. In an LTE Rel-12 system according to one embodiment of the present invention, in case of four transmit antennas, introduction of a new Rel-12 4tx codebook in addition to a legacy Rel-8 4tx codebook has been discussed. At this time, the structures of the legacy Rel-8 4tx codebook and the Rel-12 4tx codebook may differ. For example, while the Rel-8 4tx codebook is represented by one precoding matrix, the Rel-12 4tx codebook may be represented by a precoding matrix $W_1$ for wideband and a precoding matrix $W_2$ for a subband. In general, information about codebook subset restriction for restricting codewords in a codebook in an LTE system may be changed according to codebook structure.

For example, codebook subset restriction information of a codebook represented by one precoding matrix, such as an Rel-8 4tx codebook, in an LTE system is represented by a bitmap of 64 bits and 16 codewords for a 4-bit codebook at rank 1, rank 2, ..., and rank 4 are represented by 16 bits. At this time, if the codeword is restricted to a bit 0 or 1, 0 is assigned. In contrast, in codebook subset restriction information of a codebook in which a precoding matrix $W_1$ for wideband and a precoding matrix $W_2$ for subband are present, such as an Rel-12 8tx codebook, a codebook of 4 bits, 4 bits, 2 bits, 2 bits, 2 bits, 2 bits, 2 bits or 0 bits is present and 16 codewords, 16 codewords, four codewords, four codewords, four codewords, four codewords, four codewords or 1 codeword is present and restriction of the $W_1$ codeword is represented in the form of a bitmap having a total length of 53 bits with respect to rank 1, rank 2, rank 3, ..., and rank 8 for $W_1$, and a codebook of 4 bits, 4 bits, 4 bits, 2 bits, 0 bits, 0 bits, 0 bits or 0 bits is present and 16 codewords, 16 codewords, 16 codewords, four codewords, I codeword, 1 codeword, 1 codeword or 1 codeword is present and restriction of the $W_2$ codeword is represented in the form of a bitmap having a total length of 56 bits with respect to rank 1, rank 2, rank 3, ..., and rank 8 for $W_2$. Accordingly, the codebook subset restriction information of the 8tx codebook is represented in the form of a bitmap having a total length of 109 bits. Even the Rel-12 4tx codebook has the $W_1$ and $W_2$ structures similarly to the Rel-10 8tx codebook and thus the codebook subset restriction information may be transmitted similarly to the information about the Rel-10 8tx codebook. That is, in the Rel-12 system, in case of the 4tx codebook, the codebook subset restriction information should be changed depending on whether the Rel-8 4tx codebook or the Rel-12 4tx codebook is used. Accordingly, an r-11 version and an r-12 version may be generated in the future with respect to the codebook subset restriction. At this time, the version information may be used to indicate which of the Rel-8 4tx codebook and the Rel-12 4tx codebook is used. Accordingly, in the present invention, a method of changing a codebook to be fed back according to version information of a higher layer signal for codebook subset restriction when a BS supports a plurality of codebooks is proposed.

A method of changing a codebook to be fed back according to version information of a higher layer signal for a transmission Mode™ when a BS supports two or more codebooks according to another embodiment of the present invention will be described. In an LTE system according to one embodiment of the present invention, when higher layer information for the TM is sent to a UE, version information may be indicated. For example, tm9-v1020 indicates a transmission mode defined according to the LTE standard of version 10.2.0. At this time, in case of TM9, a CSI process is not defined and thus a method of indicating a codebook to be fed back among multiple codebooks in configuration information of the CSI process is not valid. Accordingly, in the present invention, as another method, a method indicating that the codebook has been changed according to version information for the TM will be described. For example, in tm9-v1020, a legacy 4tx Rel-8 codebook may be used and, in tm9-v1200, a new Rel-12 4tx codebook may be used. At this time, the UE may confirm that the codebook is changed according to version even in the same TM, that is, even in tm9.

Figure 8:
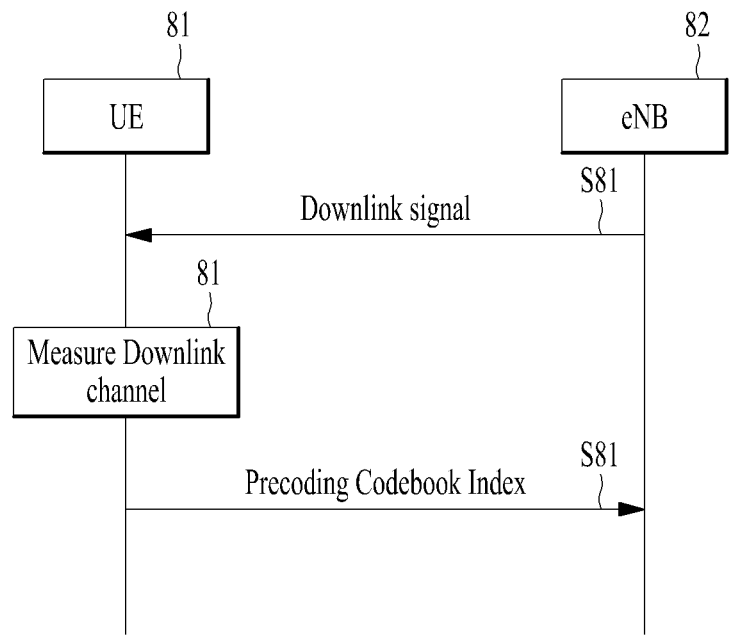
FIG. 8 is a diagram showing operation according to one embodiment of the present invention.

FIG. 8 shows operation according to one embodiment of the present invention.

A UE 81 receives a downlink signal from a BS 82 (S81). The downlink signal may be codebook based precoded as described above. For codebook based precoding, refer to the above description.

The UE may measure a downlink channel based on the downlink signal (S82). Channel state information, which may be composed of an RI, a PMI and a CQI, may be reported to the BS via downlink channel measurement (S83). In the present embodiment, only the PMI of the CSI is considered.

In one embodiment of the present invention, the codebook for precoding may include an improved codebook having a dual structure composed of a codebook for wideband and a codebook for subband, for 4 transmit (4-Tx) antenna ports and the improved codebook may include sub-sampled sub-codebooks according to subband priority. FIG. 8 shows only some of the above-described embodiments of the present invention and the UE or the BS may implement a combination of at least some of the embodiments of the present invention.

Figure 9:
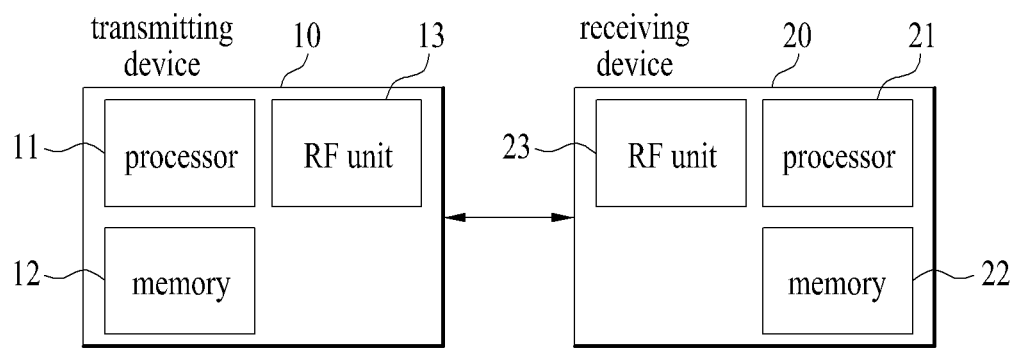
FIG. 9 is a block diagram of an apparatus for implementing embodiment(s) of the present invention.

FIG. 9 is a block diagram showing components of a transmitter 10 and a receiver 20 for performing the embodiments of the present invention. The transmitter 10 and the receiver 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signals. The memories 12 and 22 may be used as a buffer. The processors 11 and 21 generally control the overall operation of the various modules of the transmitter and the receiver. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitter 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include Nt (Nt being a positive integer) transmit antennas.

Signal processing of the receiver 20 is the inverse of signal processing of the transmitter 10. Under control the processor 21, the RF unit 23 of the receiver 20 receives a radio signal transmitted by the transmitter 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitter 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiver 20. A reference signal (RS) transmitted in correspondence with the antenna defines the antenna viewed from the viewpoint of the receiver 20 and enables the receiver 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE or a relay operate as the transmitter 10 in uplink and operates as the receiver 20 in downlink. In the embodiments of the present invention, a BS operates as the receiver 20 in uplink and operates as the transmitter 10 in downlink.

The transmitter and/or the receiver may perform a combination of at least one or two embodiments among the above-described embodiments of the present invention.

Although the embodiments of the present invention are described as a receiver operating in uplink, the embodiments of the present invention are applicable to a receiver operating in downlink.

According to one embodiment of the present invention, it is possible to more accurately and efficiently perform feedback on a downlink channel. Accordingly, it is possible to improve downlink reception performance.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention may be used for a wireless communication apparatus such as a user equipment (UE), a relay and a base station (BS).

What is claimed is:

1. A method of reporting a channel state to a base station supporting downlink multiple input multiple output (MIMO) in a wireless communication system, the method comprising:
   measuring a downlink channel based on a downlink signal received from the base station; and
   reporting an index of a codebook for precoding of the downlink signal according to the measurement of the downlink channel,
   wherein the codebook for precoding includes an improved codebook (hereinafter, referred to as an improved 4Tx codebook) having a dual structure composed of a codebook for wideband and a codebook for subband, for 4 transmit (4Tx) antenna ports, and
   wherein the improved 4Tx codebook includes sub-codebooks obtained by sub-sampling the codebook for subband according to whether the base station is configured to use a co-polarization antenna or a cross-polarization antenna for transmitting the downlink signal.

2. The method according to claim 1, wherein the codebook $C'^{(1)}$ for wideband is expressed by:

$$C'^{(1)} = \left\{ \begin{bmatrix} \tilde{W}^{(1)} & 0 \\ 0 & \tilde{W}^{(1)} D_a \end{bmatrix} \right\} \tilde{W}^{(1)} =$$

$$[\tilde{w}_{2k \bmod 16} \; \tilde{w}_{(2k+1) \bmod 16} \; \tilde{w}_{(2k+2) \bmod 16} \; \tilde{w}_{(2k+3) \bmod 16}], k = 0, 1, \ldots, 7\}$$

where, $$\tilde{w}_n = \begin{bmatrix} 1 \\ e^{j \frac{2\pi n}{16}} \end{bmatrix},$$

n=0, 1, 2, ..., 15, $$D_a = \begin{bmatrix} a_0 & 0 & 0 & 0 \\ 0 & a_1 & 0 & 0 \\ 0 & 0 & a_2 & 0 \\ 0 & 0 & 0 & a_3 \end{bmatrix},$$

and $$a_n = e^{2 \cdot j \frac{2\pi}{16} \cdot ((2k+n) \bmod 16)}.$$

3. The method according to claim 1, wherein the codebook for subband is expressed by $$C_1^{(2)} = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\}$$

for rank 1 and $$C_2^{(2)} = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\}$$

for rank 2,
where, $Y \in \{e_1, e_2, e_3, e_4\}$, $(Y_1, Y_2) \in \{(e_1,e_1), (e_2,e_2), (e_3,e_3), (e_4,e_4), (e_1,e_3), (e_2,e_3), (e_1,e_4), (e_2,e_4)\}$, and $e_n$ denotes a vector for selecting one of four elements in which only an n-th element has a value of 1 and the remaining elements have a value of 0.

4. The method according to claim 1, wherein an $i_1$-th codeword of the codebook for wideband and an $i_2$-th codeword of the codebook for subband are expressed by:

| | $i_2$ | | | |
|---|---|---|---|---|
| $i_1$ | 0 | 1 | 2 | 3 |
| 0-7 | $W_{2i_1,0}^{(1)}$ | $W_{2i_1,1}^{(1)}$ | $W_{2i_1,2}^{(1)}$ | $W_{2i_1,3}^{(1)}$ |

| | $i_2$ | | | |
|---|---|---|---|---|
| $i_1$ | 4 | 5 | 6 | 7 |
| 0-7 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

-continued

| $i_1$ | $i_2$ | | | |
|---|---|---|---|---|
| | 8 | 9 | 10 | 11 |
| 0-7 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |

| $i_1$ | $i_2$ | | | |
|---|---|---|---|---|
| | 12 | 13 | 14 | 15 |
| 0-7 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{4}}\begin{bmatrix} v_m \\ \varphi_{n,m} v_m \end{bmatrix}$ in case of rank 1, and

| $i_1$ | $i_2$ | | | |
|---|---|---|---|---|
| | 0 | 1 | 2 | 3 |
| 0-7 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-7 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-7 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-7 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \varphi_{n,m} v_m & -\varphi_{n,m'} v_{m'} \end{bmatrix}$ in case of rank 2,
where $\phi_{n,m} = e^{j\pi(n/2+m/4)}$, $v_m = [1 e^{j2\pi m/16}]^T$.

5. The method according to claim 1, wherein, if a co-polarization antenna is used by the base station, the sub-codebook is expressed by $$C_1^{(2)} = \left\{ \begin{bmatrix} Y \\ Y \end{bmatrix} \right\}$$

in case of rank 1 and by $$C_2^{(2)} = \left\{ \begin{bmatrix} Y_1 & Y_2 \\ Y_1 & -Y_2 \end{bmatrix} \right\}$$

in case of rank 2, where, $Y \in \{e_1, e_2, e_3, e_4\}$ and $(Y_1, Y_2) \in \{(e_1, e_1), (e_2, e_2), (e_3, e_3), (e_4, e_4), (e_1, e_2), (e_2, e_3), (e_1, e_4), (e_2, e_4)\}$.

6. The method according to claim 5, wherein an codeword of the codebook for wideband and an $i_2$-th codeword of the codebook for subband are expressed by:

| $i_1$ | $i_2$ | | | |
|---|---|---|---|---|
| | 0 | 1 | 2 | 3 |
| 0-7 | $W_{2i_1}^{(1)}$ | $W_{2i_1+1}^{(1)}$ | $W_{2i_1+2}^{(1)}$ | $W_{2i_1+3}^{(1)}$ | where $W_m^{(1)} = \frac{1}{\sqrt{4}}\begin{bmatrix} v_m \\ \varphi_m v_m \end{bmatrix}$ in case of rank 1, and

| $i_1$ | $i_2$ | | | |
|---|---|---|---|---|
| | 0 | 1 | 2 | 3 |
| 0-7 | $W_{2i_1,2i_1}^{(2)}$ | $W_{2i_1+1,2i_1+1}^{(2)}$ | $W_{2i_1+2,2i_1+2}^{(2)}$ | $W_{2i_1+3,2i_1+3}^{(2)}$ |

| $i_1$ | $i_2$ | | | |
|---|---|---|---|---|
| | 4 | 5 | 6 | 7 |
| 0-7 | $W_{2i_1,2i_1+1}^{(2)}$ | $W_{2i_1+1,2i_1+2}^{(2)}$ | $W_{2i_1,2i_1+3}^{(2)}$ | $W_{2i_1+1,2i_1+3}^{(2)}$ | where $W_{m,m'}^{(2)} = \frac{1}{4}\begin{bmatrix} v_m & v_{m'} \\ \varphi_m v_m & -\varphi_{m'} v_{m'} \end{bmatrix}$ in case of rank 2,
where, $\phi_m = e^{j\pi m/4}$, $v_m = [1 e^{j2\pi m/16}]^T$.

7. The method according to claim 1, wherein, if a cross polarization antenna is used by the base station, the sub-codebook is expressed by $$C_1^{(2)} = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\}$$

in case of rank 1 and by $$C_2^{(2)} = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\}$$

in case of rank 2, where, $Y \in \{e_1\}$ and $(Y_1, Y_2) \in \{(e_1, e_1)\}$.

8. The method according to claim 7, wherein an $i_1$-th codeword of the codebook for wideband and an $i_2$-th codeword of the codebook for subband are expressed by:

| $i_1$ | $i_2$ | | | |
|---|---|---|---|---|
| | 0 | 1 | 2 | 3 |
| 0-7 | $W_{2i_1,0}^{(1)}$ | $W_{2i_1,1}^{(1)}$ | $W_{2i_1,2}^{(1)}$ | $W_{2i_1,3}^{(1)}$ | where $W_{m,n}^{(1)} = \frac{1}{\sqrt{4}}\begin{bmatrix} v_m \\ \varphi_{n,m} v_m \end{bmatrix}$ in case of rank 1, and

| $i_1$ | $i_2$ | |
|---|---|---|
| | 0 | 1 |
| 0-7 | $W_{2i_1,2i_1,0}^{(2)}$ | $W_{2i_1,2i_1,1}^{(2)}$ |

-continued $$\text{where } W^{(2)}_{m,m'n} = \frac{1}{4}\begin{bmatrix} v_m & v_{m'} \\ \varphi_{n,m}v_m & -\varphi_{n,m'}v_{m'} \end{bmatrix}$$

in case of rank 2, where, $\phi_{n,m}=e^{j\pi(n/2+m/4)}$, $v_m=[1 e^{j2\pi m/16}]^T$.

9. The method according to claim 1, wherein, if N bits are set for the improved 4Tx codebook or the sub-codebook and M bits are set for the report, the reporting the index of the codebook for precoding includes selecting $2^M$ codewords from among $2^N$ codewords.

10. The method according to claim 1, further receiving an indicator indicating that the improved 4Tx codebook or a legacy codebook for 4Tx antennas is set for reporting the index of the codebook for precoding,
wherein the indicator is configured according to channel state information-reference signal resources, a version of a channel state information-reference signal or channel state information process, a version of a higher layer signal for a codebook subset restriction or a version of a higher layer signal for a transmission mode.

11. A user equipment (UE) configured to report a channel state to a base station supporting downlink multiple input multiple output (MIMO) in a wireless communication system, the UE comprising:
a radio frequency (RF) unit; and
a processor configured to:
control the RF unit,
measure a downlink channel based on a downlink signal received from the base station, and
report an index of a codebook for precoding of the downlink signal according to the measurement of the downlink channel,
wherein the codebook for precoding includes an improved codebook (hereinafter, referred to as an improved 4Tx codebook) having a dual structure composed of a codebook for wideband and a codebook for subband, for 4 transmit (4Tx) antenna ports, and
wherein the improved 4Tx codebook includes sub-codebooks obtained by sub-sampling the codebook for subband according to whether the base station is configured to use a co-polarization antenna or a cross-polarization antenna for transmitting the downlink signal.

12. A base station supporting downlink multiple input multiple output (MIMO) in a wireless communication system, the base station comprising:
a radio frequency (RF) unit; and
a processor configured to:
control the RF unit,
transmit a downlink signal to a user equipment (UE), and
receive an index of a codebook for precoding of the downlink signal according to a measurement of the downlink channel based on the downlink signal,
wherein the codebook for precoding includes an improved codebook (hereinafter, referred to as an improved 4Tx codebook) having a dual structure composed of a codebook for wideband and a codebook for subband, for 4 transmit (4Tx) antenna ports, and
wherein the improved 4Tx codebook includes sub-codebooks obtained by sub-sampling the codebook for subband according to whether the base station is configured to use a co-polarization or across-polarization antenna for transmitting the downlink signal.

* * * * *